Feb. 23, 1943.                J. MILLS                2,312,114
              APPARATUS FOR FOOD PROCESSING
                    Filed July 6, 1939       13 Sheets-Sheet 3
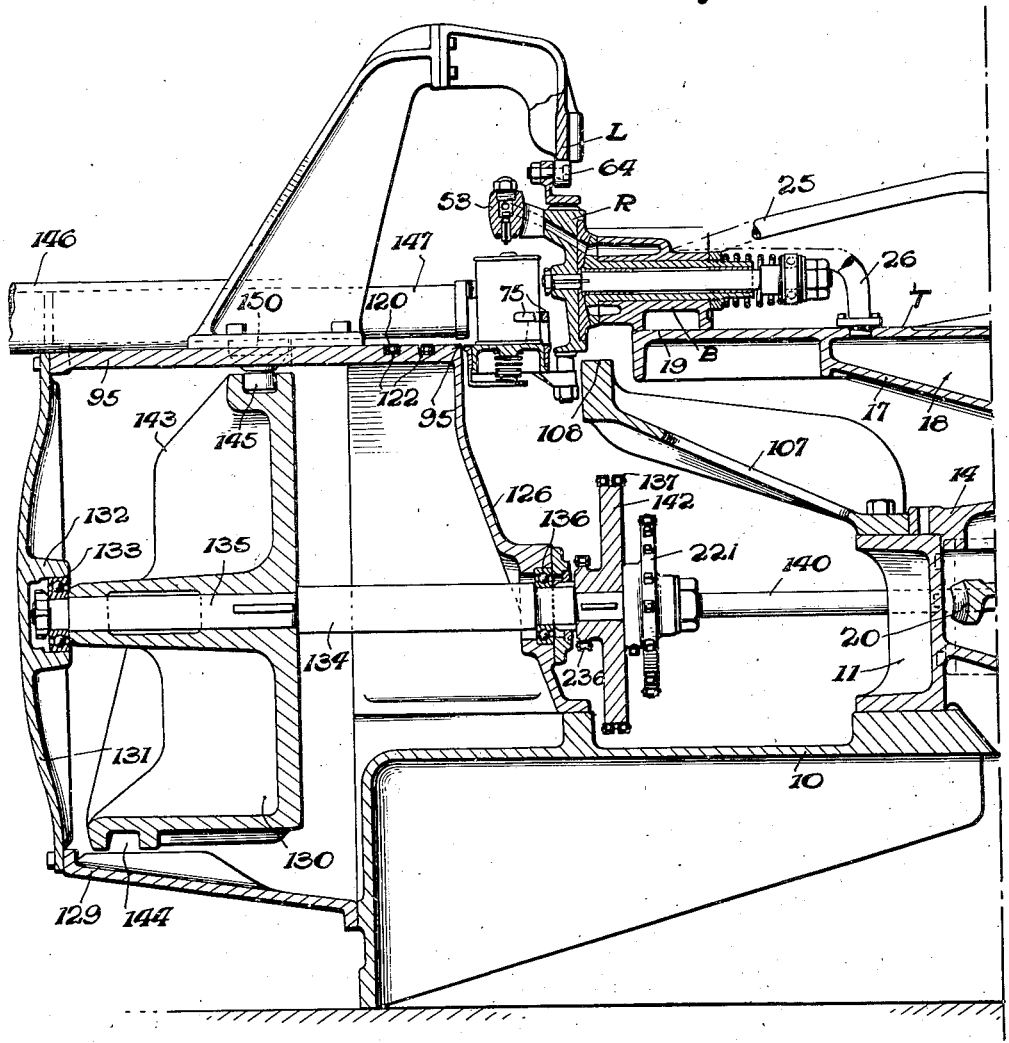
Inventor
John Mills.

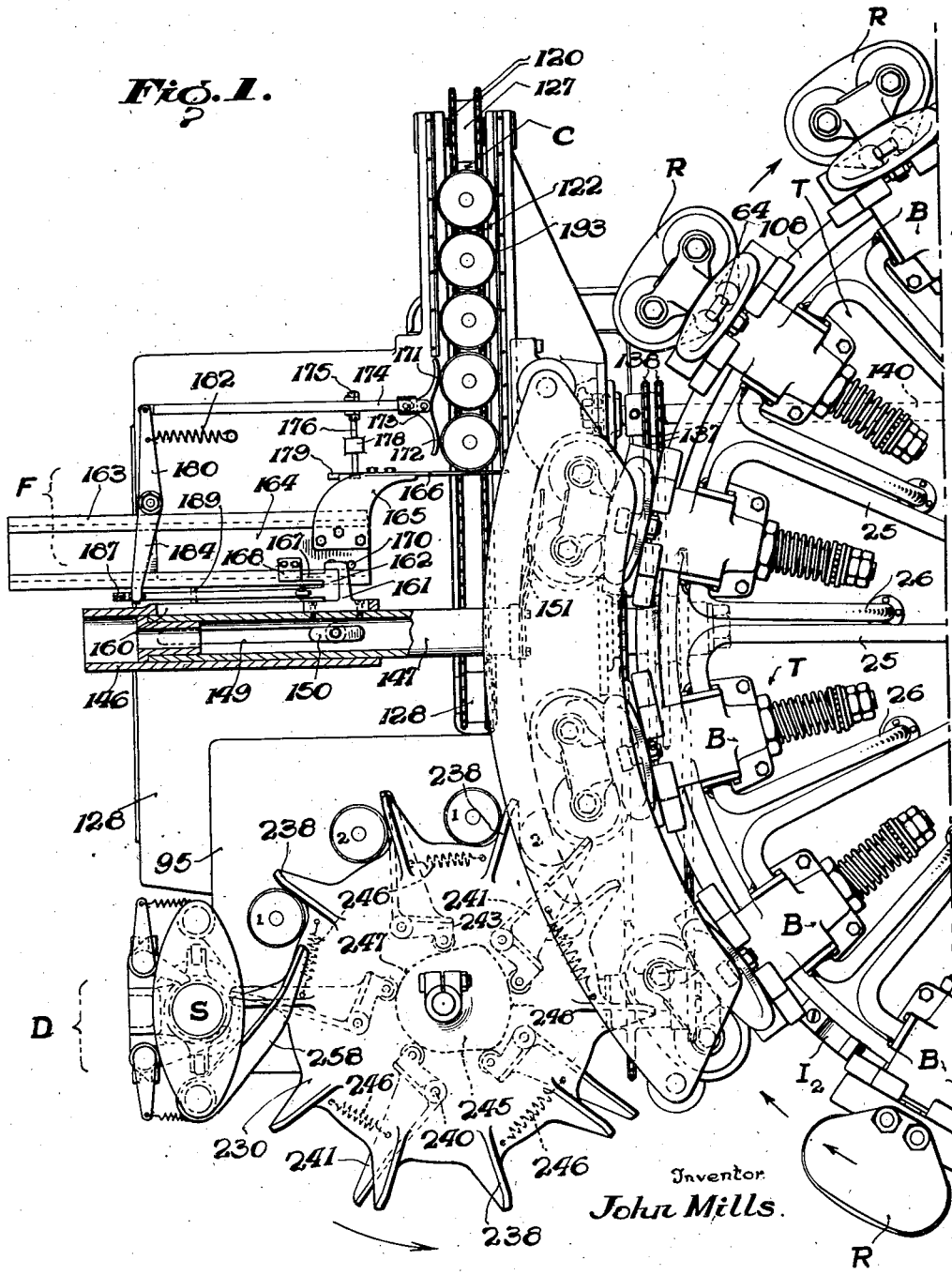

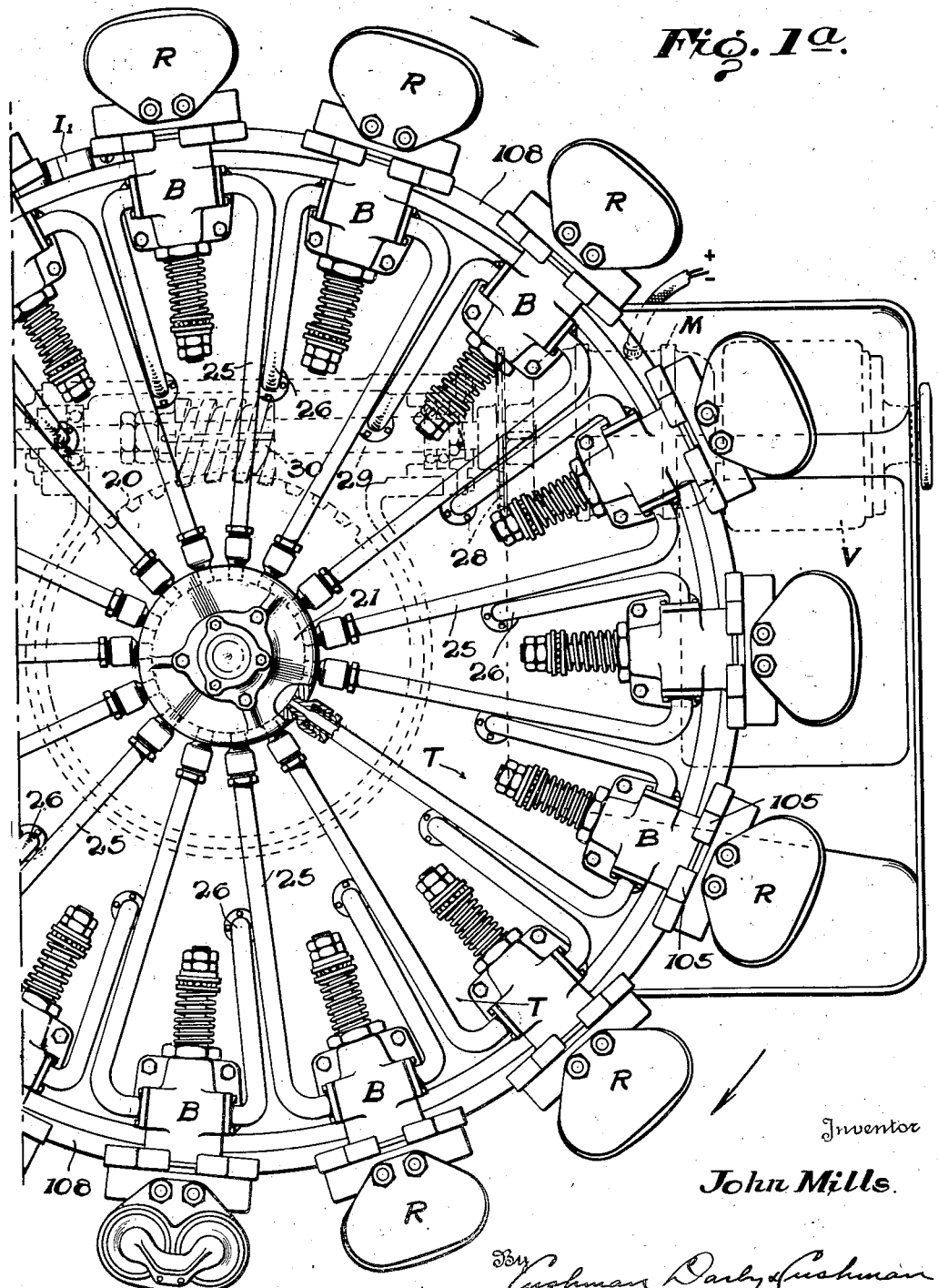

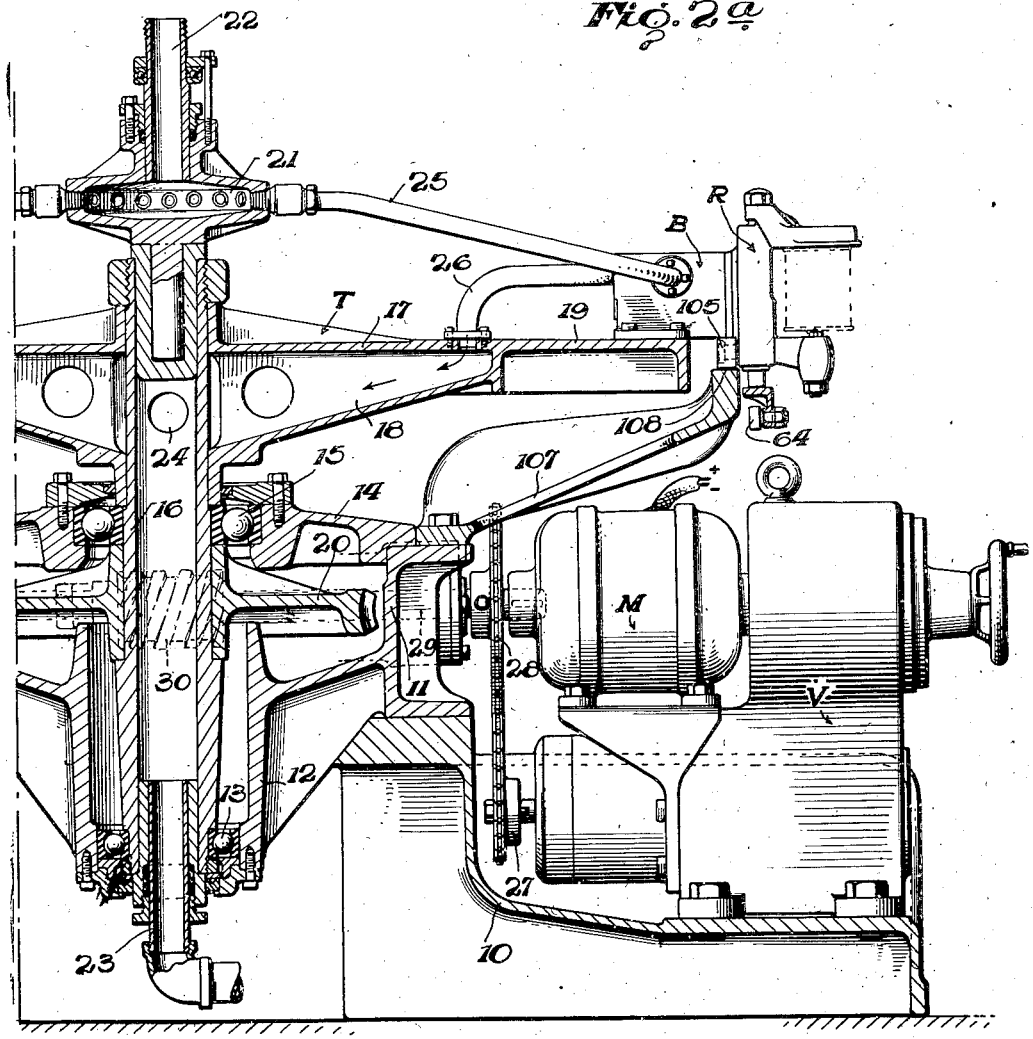

Feb. 23, 1943.  J. MILLS  2,312,114
APPARATUS FOR FOOD PROCESSING
Filed July 6, 1939  13 Sheets-Sheet 5
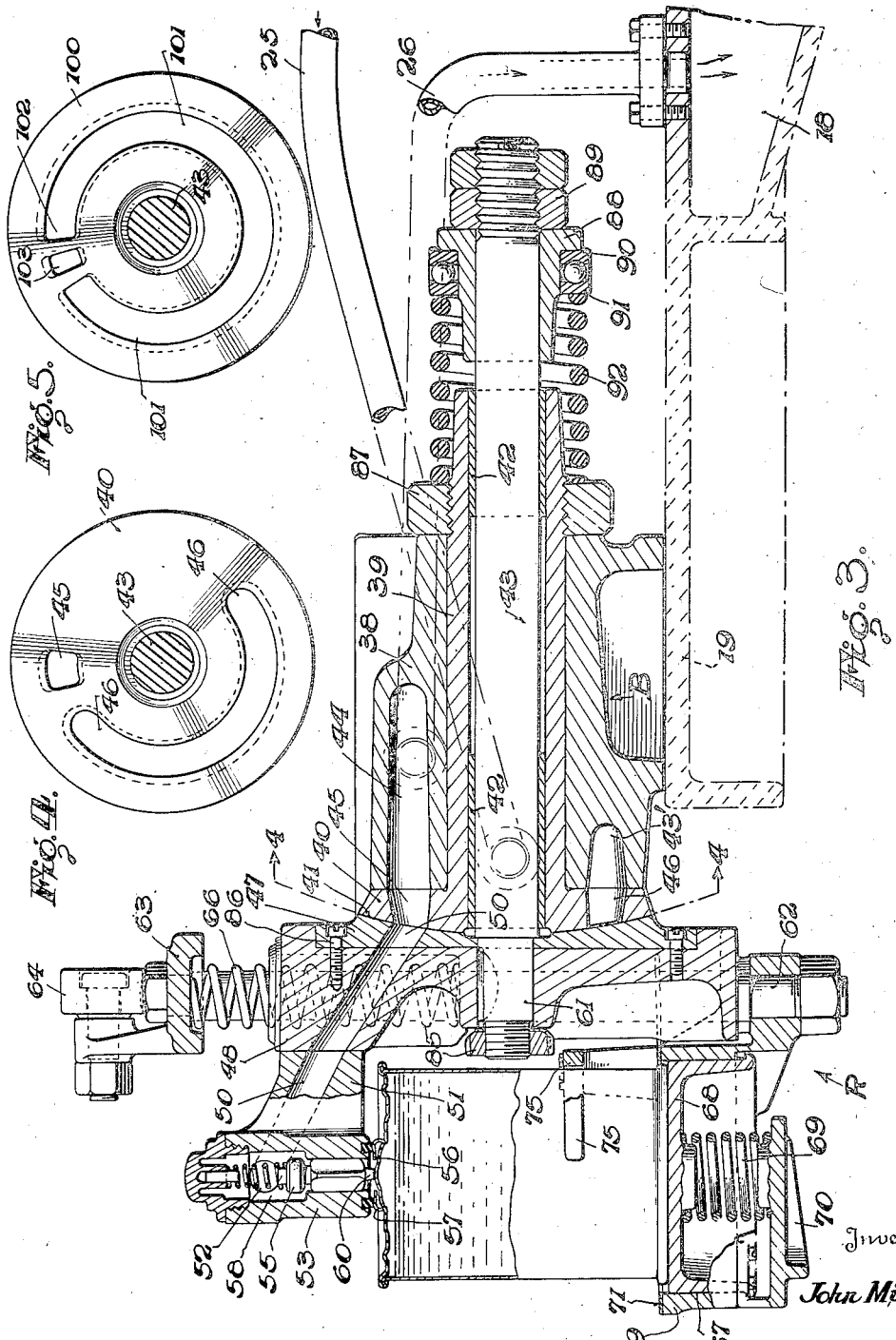
Inventor
John Mills.
By Cushman Darby & Cushman
Attorneys

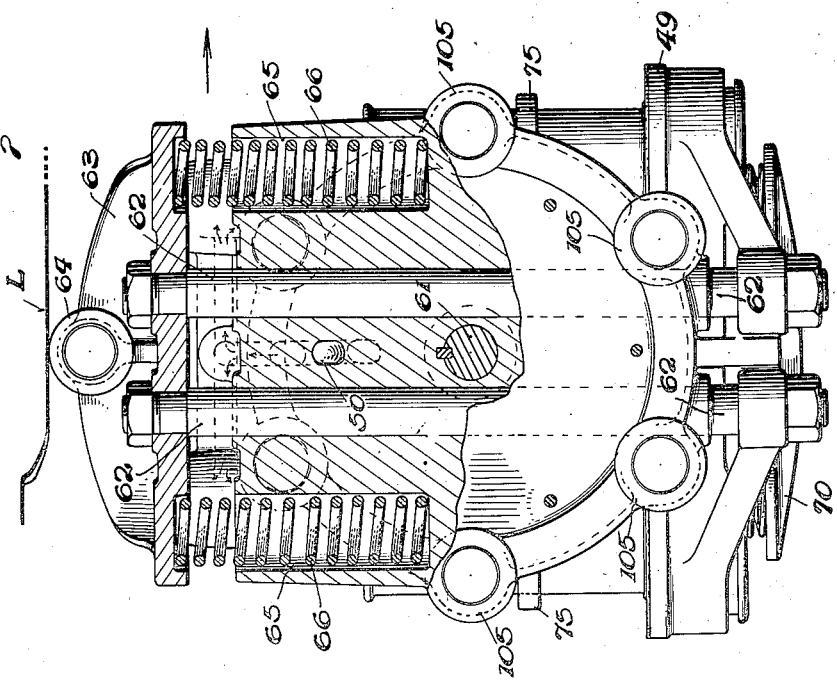
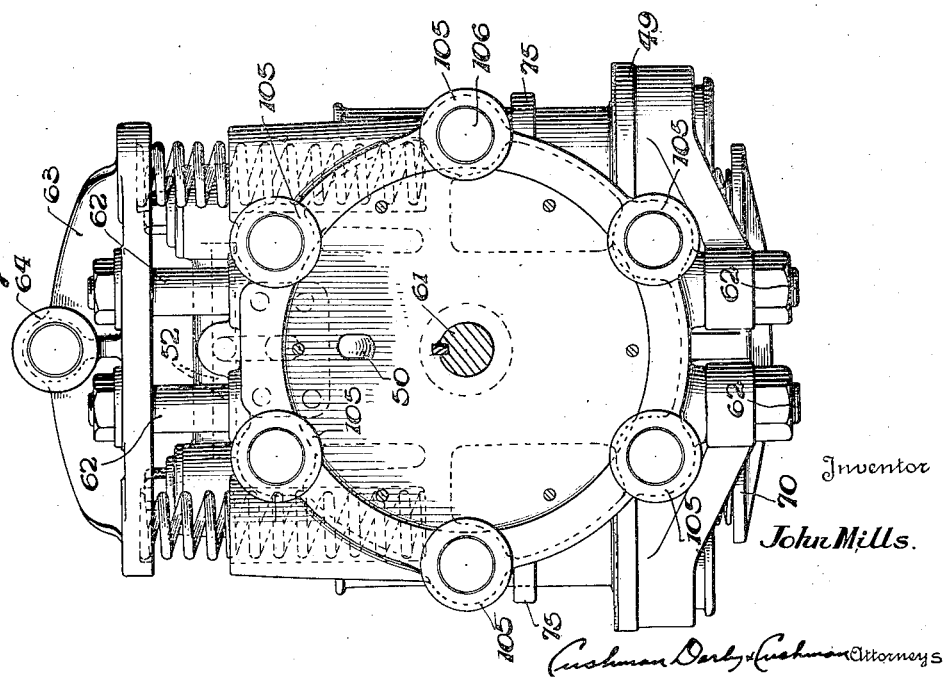

Inventor
John Mills.
By Cushman Darby & Cushman
Attorneys

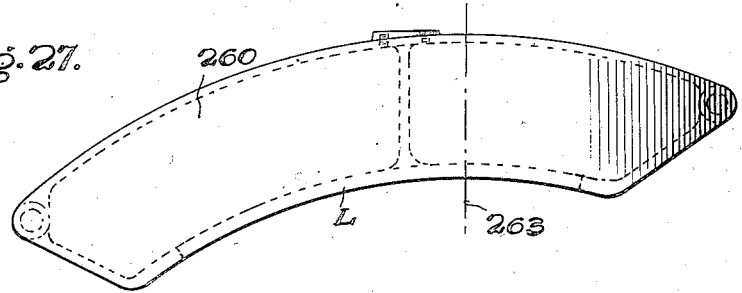
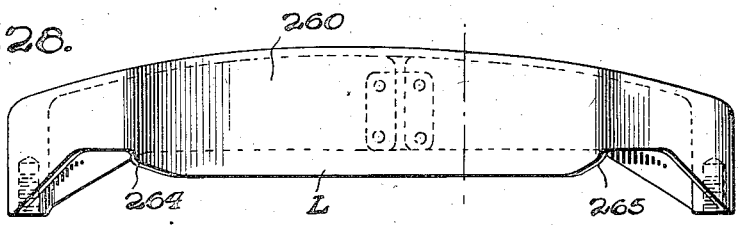
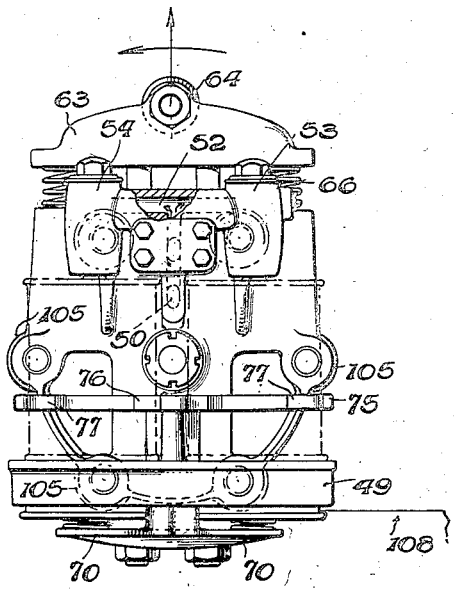
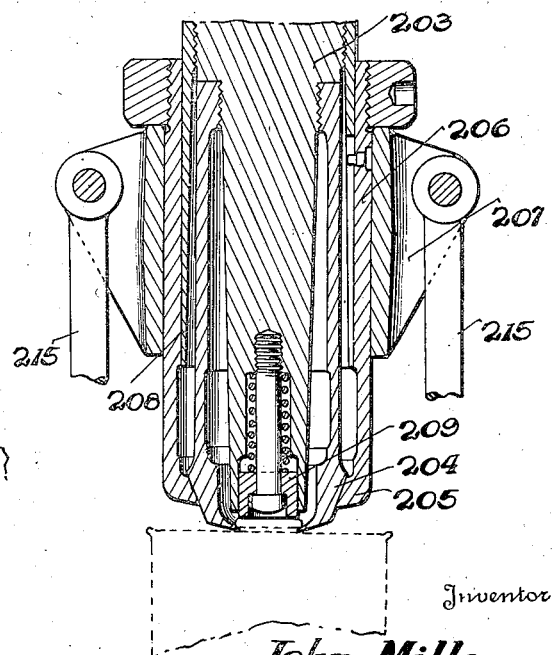

Feb. 23, 1943.                J. MILLS                2,312,114
                      APPARATUS FOR FOOD PROCESSING
                Filed July 6, 1939         13 Sheets-Sheet
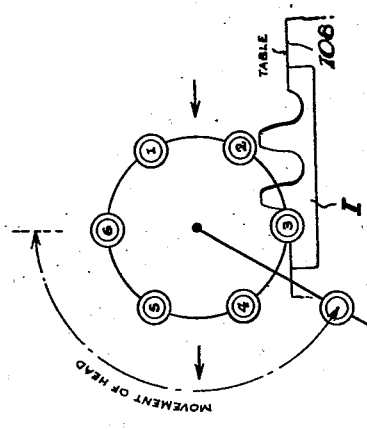
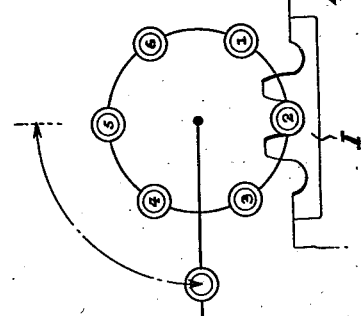
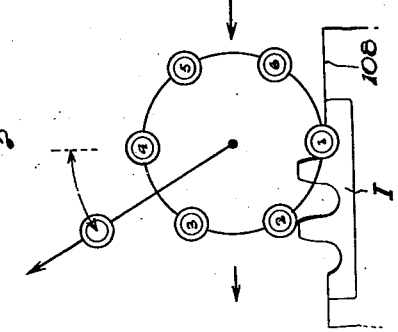
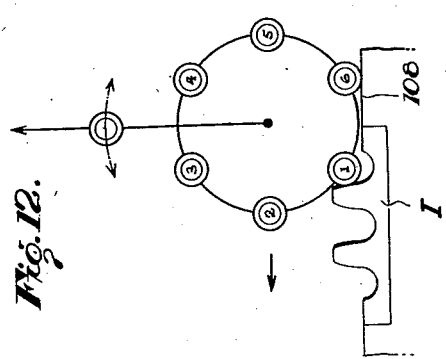
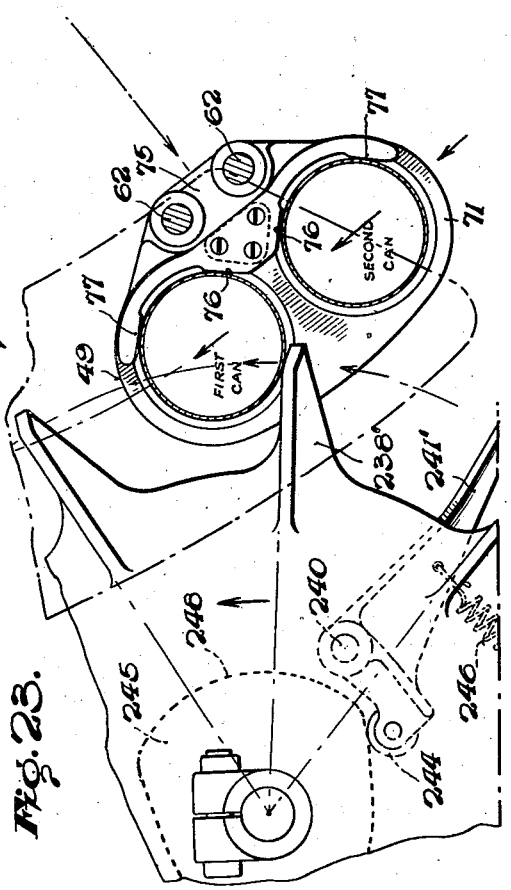
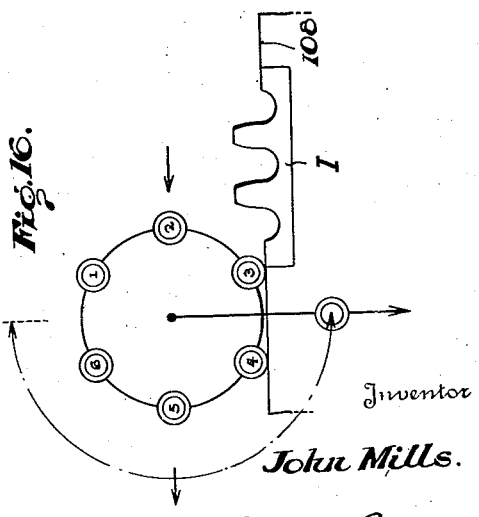
Inventor
John Mills.
By Cushman Darby & Cushman
Attorneys

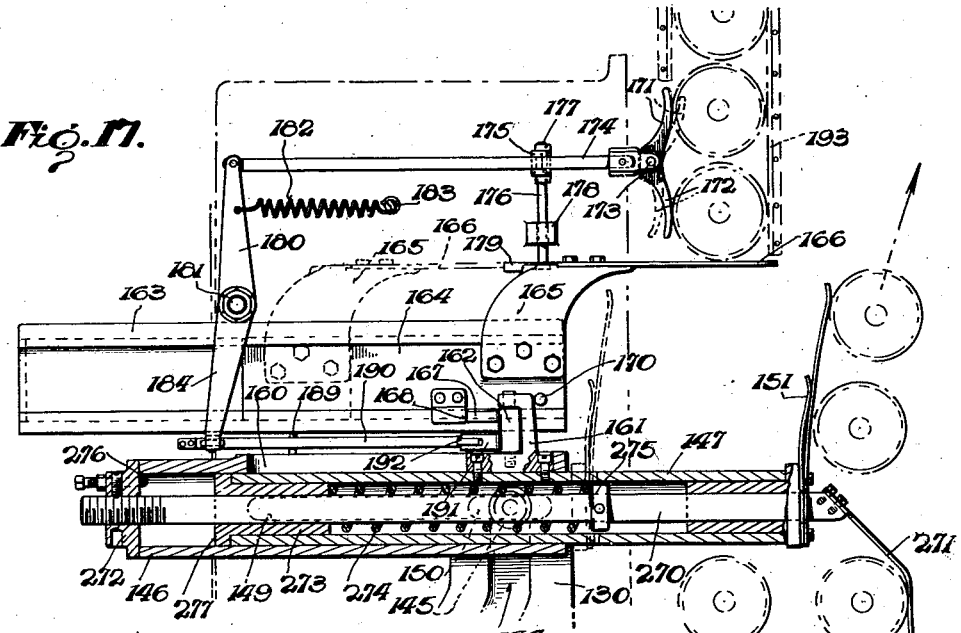

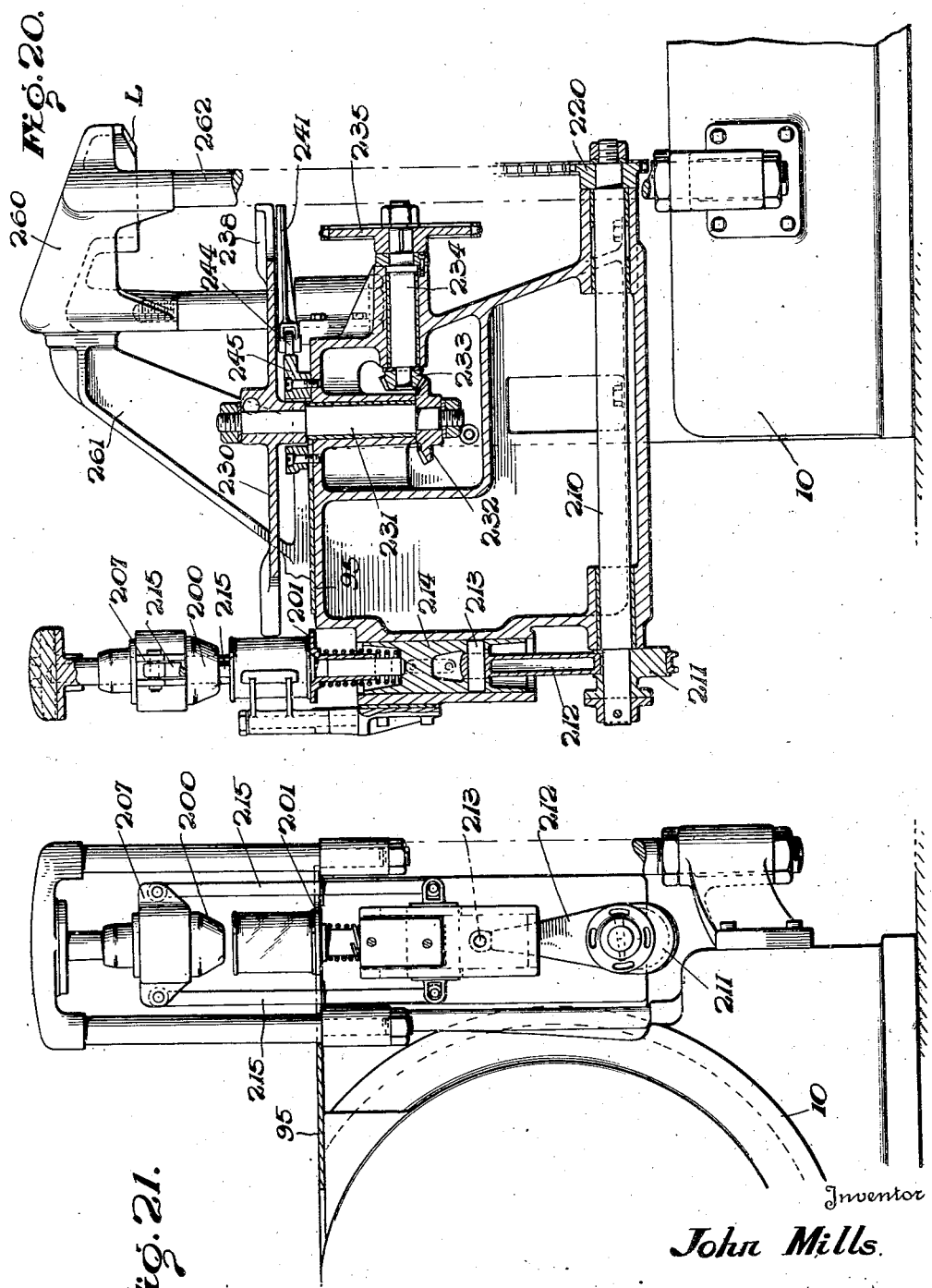

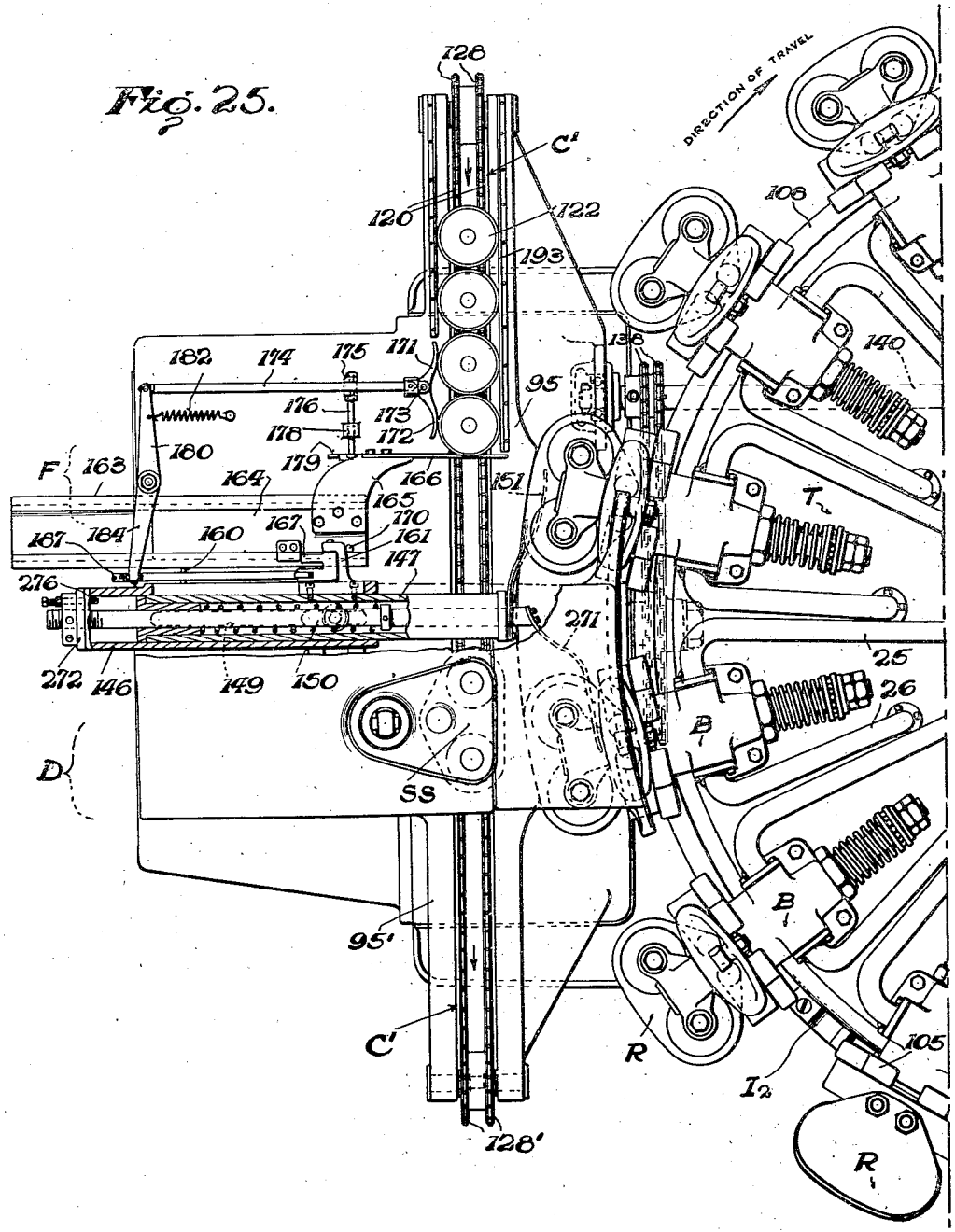

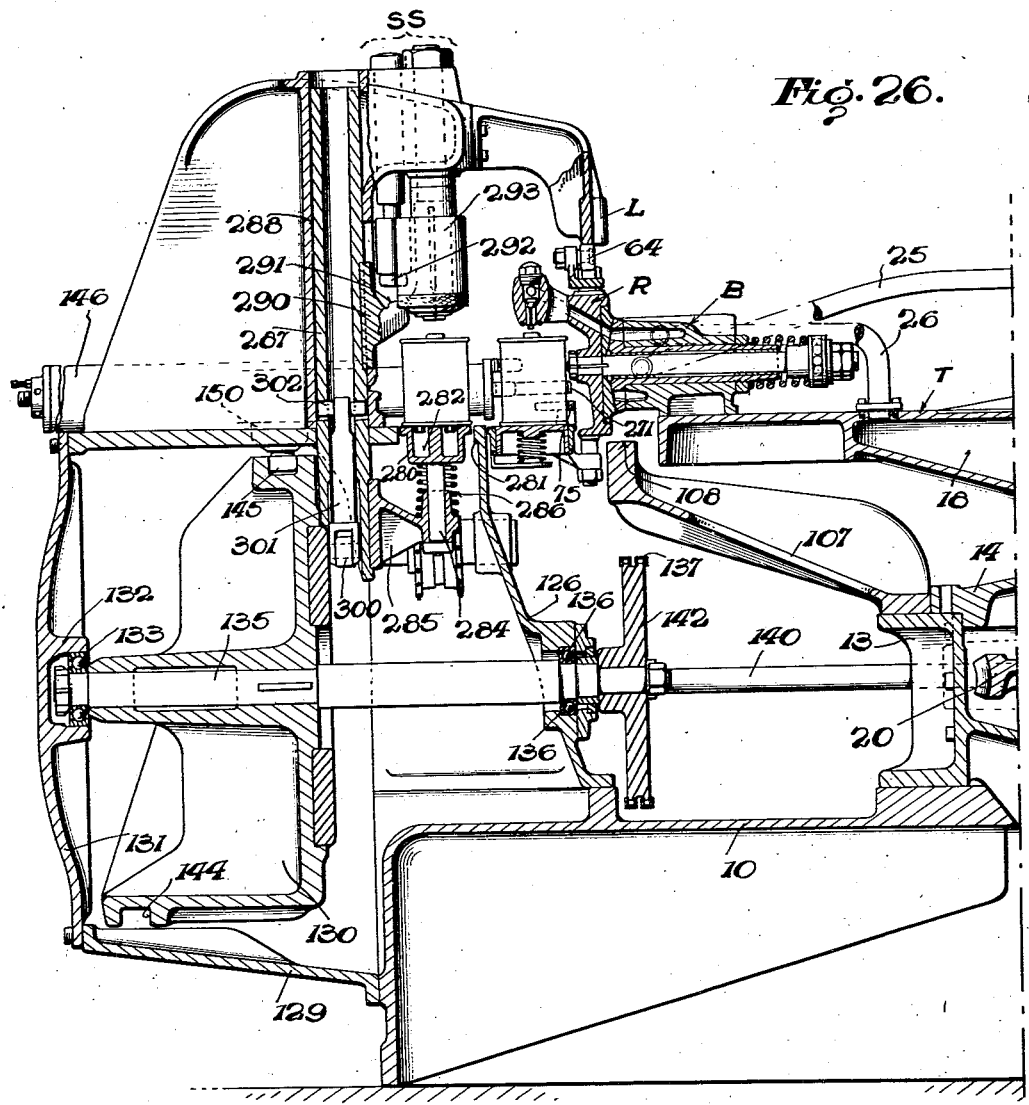

Patented Feb. 23, 1943

2,312,114

UNITED STATES PATENT OFFICE 2,312,114

APPARATUS FOR FOOD PROCESSING

John Mills, Philadelphia, Pa., assignor to Crown Can Company, Philadelphia, Pa., a corporation of Pennsylvania Application July 6, 1939, Serial No. 283,115

16 Claims. (Cl. 99—251)

The present invention relates to machines for treating products in containers, particularly food products such as fruit and fruit juices, vegetables and vegetable juices and milk and milk products.

The machine is designed to treat products in containers of the valved type, for instance, as described in the patents to Fenn, No. 1,728,533, September 17, 1929, and Ford, No. 1,963,782, June 19, 1934, although it will be apparent that it may be adapted for use in processing products in other types of containers.

The principal object of the invention is to provide an improved machine for treating products in containers wherein the air and gases are removed from the head space of the containers and thereafter the product is treated with steam or the like to sterilize or cook the product. More particularly, it is intended to provide an improved machine which provides for removal of air and gases from the head space of the containers when they are in substantially upright position, and thereafter automatically inverts the containers and supplies steam under pressure to intimately treat all parts of the product therein.

An object of the invention is to provide a machine for simultaneously treating products in a group of containers in the manner referred to above.

Another object of the invention is to provide a revoluble turret carrying receivers for the containers, the receivers having means for controlling the exhausting of air from, and inlet of steam to the containers, by individual movement of the receivers during revolution of the turret, as distinguished from providing such control with a central valve on the turret. More specifically, it is an object of the invention to provide such control by rotation of the individual container receivers during revolution of the turret.

Ancillary to the preceding objective, it is a purpose of the invention to provide a machine as referred to, wherein rotation of the individual container receivers during revolution of the turret provides for preliminary exhausting air and gases from the head space of the containers, and thereafter causes steam to be supplied to the interior of the containers during further revolution of the turret, the receivers carrying the containers in substantially upright position during the exhausting step and moving them to inverted position for treatment of the product with steam. More particularly, each of the container receivers is provided with a port which registers with steam and exhaust ports carried by a supporting member or bracket by which the receiver is attached to the turret, said ports moving into and out of register by rotation of the receiver on its bracket during revolution of the turret, to treat the contents of the containers as described above.

Another object of the invention is to provide a container receiver which is adapted to carry a group of containers and provide for simultaneously treating their contents as referred to above.

Included in the preceding objective, it is the intention of the invention to provide such a receiver having a treating head and a can supporting platform adapted to support a plurality of containers, said receiver having means thereon operable during revolution of the turret for moving the supporting platform upwardly to engage the containers with the treating head and downwardly to bring the containers out of engagement with the treating head, the containers being fed onto and discharged from the platform when the latter has been moved downwardly.

A further object of the invention is to provide a machine of the above type having infeed mechanism, including a conveyor for bringing the containers in a line to the infeed station adjacent the turret, and means for there arranging a number of the containers in a group and for simultaneously feeding the group so arranged onto the turret in side by side relation, the group being received by one of the receivers on the turret. More particularly, the infeed includes a continuously operating conveyor which approaches the turret tangentially, a gate at the infeed station which extends across the conveyor to block the movement of the containers on the conveyor, an infeed plunger operating across the conveyor in front of the gate, and a trip finger behind the gate responsive to the proper positioning of a group of containers against the gate which operates to permit withdrawal of the gate for passage of the group of containers and subsequent inward movement of the infeed plunger to feed said group of containers onto the turret.

Another object of the invention is to provide a machine of the above type having means which discharges the groups of containers from the turret, and spaces the containers of a group from one another as they are discharged. This discharge means is provided so that the containers may be passed in spaced relation, one behind another, to a device which individually seals the containers. The sealing device may take various forms, depending on the type of containers being treated. In this application, I have disclosed the sealing device as being a clinching unit for containers of the valved type, said unit being of any appropriate construction similar to that described in my Patent No. 2,054,092, Sept. 15, 1936, and illustrated in Fig. 10 thereof. More specifically, the discharge means comprises a star wheel having cooperating spaced fixed and movable teeth, one container of a group being engaged by a fixed tooth and one by a cooperating movable tooth as the containers are taken from the turret, the spacing of the movable tooth from the fixed tooth being widened by a cam during turning of the star wheel to properly space the containers as they are discharged. Thus, the container sealing device or clincher can conveniently operate on the containers individually as they are fed thereto in spaced relation.

Another object of the invention is to provide a container discharge means which removes the containers from the turret in groups. Associated with this means is a multiple sealing unit, or clinching device, of any appropriate construction, which simultaneously seals or clinches the valves of a group of containers. This clinching device is located over a continuation of the infeed conveyor, and may be of any well known construction, such as is illustrated in the Mills Patent No. 2,054,092, but made multiple to operate on a group of containers, and an elevating platform is provided onto which the group of containers is discharged, this platform raising the group of containers up through the conveyor to the clincher. Thereafter, the platform lowers the group of containers back onto the conveyor, and the latter carries them away from the machine.

Ancillary to the preceding objective, it is a purpose of the invention to provide a combined infeeding and discharging mechanism for feeding a group of containers onto the turret and for discharging them therefrom in a group. This combined mechanism comprises the gate and infeed plunger previously referred to, and attached to the latter is a discharging arm which operates in conjunction with said plunger to discharge a group of containers from the turret when the infeed plunger is retracted after having fed a group of containers onto the turret.

Various other objects and advantages of the invention will be apparent as the specification progresses.

In the drawings, which are illustrative of machines embodying the invention, which drawings are not intended to restrict the invention to any precise form or forms:

Figure 1 is a top plan view of one side of the machine at the infeed and discharging stations, with portions of the enclosure broken away to show the operating parts.

Figure 1a is a similar top plan view showing that part of the machine not in view in Figure 1.

Figure 2 is a central vertical sectional view of the side of the machine shown in Figure 1.

Figure 2a is a similar central vertical sectional view of that part of the machine in view in Figure 1a.

Figure 3 is a central vertical sectional view of a container receiver and its bracket, taken radially of the turret.

Figures 4 and 5 are face views of the fixed valve members of the container receiver brackets, looking toward the center of the turret.

Figure 6 is a side elevational view of the body of one of the container receivers, looking outwardly from the center of the turret and showing the support for the containers in elevated position.

Figure 7 is a view similar to Figure 6, but partly in section, showing the container platform in depressed position.

Figure 9 is a side elevational view of a container receiver, partly in section, looking toward the center of the turret.

Figure 10 is a view looking down on the receiver track of the turret, showing the receiver rotating cams or teeth.

Figure 11 is a side elevational view of the track and cam of Figure 10.

Figures 12 through 16 are diagrammatical side views showing successive positions of a container receiver as it is rotated through 180 degrees on its axis, the views being assumed to be taken looking toward the center of the turret.

Figure 17 is an enlarged plan view of the infeed mechanism shown in Figure 1. This view also shows a modification of the invention wherein means for simultaneously discharging pairs of containers from the turret is secured to the infeed mechanism.

Figure 18 is a side elevational view of the mechanism for latching the infeed plunger to the gate which extends over the conveyor at the infeed station.

Figure 19 is an end view of the mechanism of Figure 17, looking outwardly from the turret.

Figure 20 is a vertical sectional view through the table at the side of the turret, showing the container discharging star wheel and the individual container clincher in section.

Figure 21 is a back view of the container clincher of Figure 20, looking toward the turret.

Figure 22 is a vertical sectional view through the container clincher of Figures 20 and 21, one of the containers being diagrammatically illustrated in clinching position.

Figures 23 and 24 are top plan views of a portion of the container discharging star wheel, showing the manner of removing a pair of containers from the container receiver.

Figure 25 is a top plan view of one side of the machine, similar to Figure 1, but showing a modified arrangement for simultaneously discharging and clinching pairs of containers.

Figure 26 is a vertical sectional view of the modified machine of Figure 25.

Figures 27 and 28 are detail views of the overhead cam at the infeed and discharging stations for lowering the container supporting platforms on the container receivers.

Figure 8:
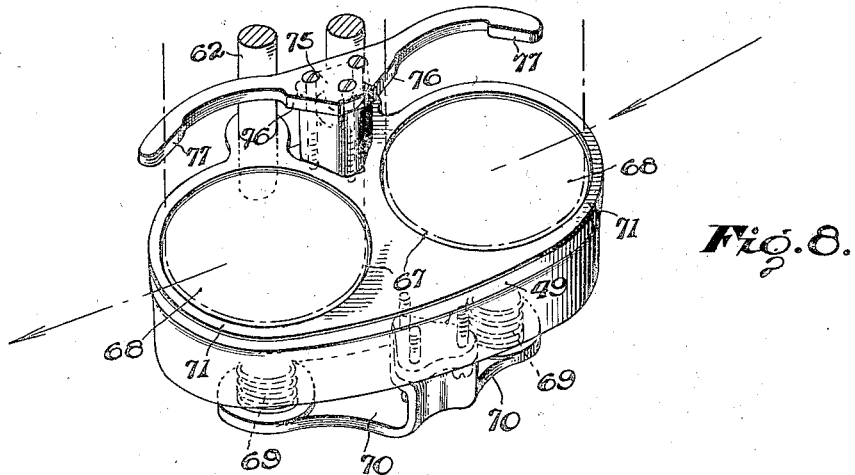
Figure 8 is a perspective view of the container receiver support and platforms, showing the container centering bracket.

Referring to Figures 1, 1a, 2 and 2a, the turret T is shown mounted for rotation about a vertical axis. Adjacent its periphery, the turret carries a plurality of container receivers R. Any appropriate number of said receivers may be employed, but in the drawings I have illustrated a turret carrying fifteen of such receivers. Each receiver is supported for individual rotation during revolution of the turret on a supporting member or bracket B, and is adapted to simultaneously receive for treatment a plurality of containers. The receivers are designed to receive two containers in the embodiment disclosed in the drawings.

As viewed in Figure 1 and 1a, the turret revolves about its vertical axis in a clockwise direction, and extending tangentially of the turret is a continuously moving infeed conveyor C. This conveyor brings the containers up to the turret in a line to a container infeed station, indicated generally by the numeral F at the left hand side of Figure 1. The containers approaching the turret on the conveyor are fed onto the turret container receivers in groups of two, in a manner hereinafter described, and each group is carried around with the turret by a receiver while the contents of the containers are being treated. When the containers are fed to their receivers, valve mechanism associated with the latter places the contents of the containers in communication with a source of suction or vacuum, and air and gases are exhausted from the head space of the containers which are at this time in an upright position. Thereafter, as the turret revolves, a suitable cam I₁, Figure 1a, carried by the turret, cooperating with the receivers, serves to turn or rotate them throughout 180° to inverted position. As the receivers are being rotated and after they are so inverted, steam is caused to be injected into the contents of the containers to treat the product therein. When a particular receiver has been carried almost completely around the turret, it approaches a discharging station indicated generally by the letter D at the left hand side of Figure 1, where a container discharging mechanism, to be later described, removes the containers from the receivers and from the turret, and carries them to a container sealing or clinching mechanism indicated generally by the letter S. Just before a particular receiver reaches the discharging station, another receiver turning or rotating cam I₂, Figure 1, on the turret, comes into operation, and again turns the receivers through 180° to place them in upright position preliminary to their being discharged. As the particular receiver moves into the discharging station, an overhead cam L, Figure 2, causes the container supporting platform on the receiver to be depressed so that the containers may be discharged.

*The revoluble turret and container receivers*

Referring to Figures 2 and 2a, the turret is carried on a base 10. Secured on the base is an upwardly extending frame member 11 carrying a central tubular casting 12 which forms a support for a ball bearing 13. Secured across the top opening of the frame member 11 is a substantially circular plate 14, which forms a support for a second ball bearing 15.

The turret comprises a central vertical hollow shaft 16 mounted for rotation in the bearings 13 and 15, and a hollow casting 17 which constitutes the turret proper. The hollow closed interior 18 of the casting 17 constitutes a turret exhaust chamber for a purpose to be later described. The peripheral area 19 of the top of the turret has secured thereto supporting members or brackets B for the container receivers R, as previously referred to. The turret casting 17 is provided with a central opening and is fitted around and secured to the hollow shaft 16. Keyed to the exterior of the hollow shaft 16 below the plate 14 is a large gear 20 which serves to revolve the turret. Secured to the upper end of the hollow shaft 16 and rotating therewith is a central turret steam chamber 21, to which steam under pressure is supplied through the pipe 22 from any convenient source. Extending into the lower end of the hollow shaft 16 is a vacuum or exhaust pipe 23, which may be connected to a vacuum pump or other suction creating means, or may simply open to atmosphere depending on the method employed to exhaust air from the containers. The interior of the hollow shaft 16 is in communication with the interior 18 of the turret proper by such means as openings 24 in the shaft.

The turret steam chamber 21 is equipped with a plurality of outlets, one for each container receiver, and a plurality of steam pipes 25 constantly maintain communication between this chamber and auxiliary steam chambers within each of the chambered container receiver brackets B as shown in Figures 1 and 1a. Exhaust lines 26 maintain constant communication between auxiliary exhaust chambers within each container receiver bracket and the main exhaust chamber 18 of the turret proper. The steam chamber 21 is isolated from the interior of the hollow shaft 16 and the exhaust chamber 18.

The machine is driven by a motor M shown in Figures 1a and 2a, which drives a pulley 27 through a suitable variable speed transmission V. By means of a chain connection, a pulley 28 is driven from pulley 27, pulley 28 being carried on a drive shaft 29, Figure 1a, which is journaled in the frame of the machine. Shaft 29 carries a worm 30 which meshes with and drives the gear 20 on the hollow central shaft 16 of the turret. Shaft 29 also extends beyond the point where its worm engages gear 20 to drive the infeed conveyor, the main cam drum of the infeed mechanism, the star wheel discharge, and the container clincher, as will be later described.

Figures 3 through 9 disclose the construction of the container receivers and their supports or brackets. Each bracket B is bolted to the outer surface 19 of the turret, and comprises a chambered outside shell 38 having a central longitudinal bore through which extends a hollow fixed valve member sleeve 39. The outer end of the sleeve 39 is integrally connected with a fixed valve member 40 having a spherical valve face 41.

The hollow sleeve 39 has a pair of spaced bearing rings 42 therein. These rings support a container receiver shaft 43 for rotation within sleeve 39. The shell 38 is hollowed out at 43' and 44, providing, respectively, separate auxiliary steam and exhaust conduits or chambers which are isolated from one another. The steam chamber 43' is connected to and is in constant communication with the steam line 25, while exhaust chamber 44 is connected with and is in continuous communication with the exhaust line 26. The valve member 40 has an exhaust port 45 extending therethrough adjacent its upper end. It also has an arcuate steam port 46 extending therethrough.

Figure 4 shows the face of the valve member 40, looking toward the center of the turret. The exhaust port 45 is of limited extent and located adjacent the upper end of the valve member, while the steam port 46 extends through an arc of substantially 180° beginning at a position substantially 30° from the top radius line of the valve member, as shown in Figure 4.

The receiver comprises a body 48 and a container support 49. Secured to the inner wall of the body of the receiver is a plate 47 which constitutes a movable valve member. This plate has a valve header port or passage 50 extending upwardly therethrough, which continues up into the treating head 51, where it joins a horizontal passage 52 extending between the two valve header housings 53 and 54 as shown in Figure 9. The valve header housings are hollow, and they carry therein header valves 55 which are spring-pressed toward their seats, but which may be raised from their seats by the elevation of a container in the receiver as shown in Figure 3. The construction of the individual valve headers is similar to that shown in Figure 5 of the patent to Mills, No. 2,054,092, Sept. 15, 1936, and the valves of the containers operated on by the machine of the present invention are substantially the same as those shown in said patent.

In Figure 3, a container is shown in position in the receiver. The valve 56 in the upstanding cylindrical projection 57 of the container is in depressed or open position, and at the same time the engagement of this valve with the depending abutment 60 on the header valve raises said valve from its seat against its spring. When a container is in this position, communication is established from the interior of the container to the chamber 58 of the valve header, and through passages 52 and 50 to either the steam chamber 43' or the exhaust chamber 44, depending on the degree of rotation of the receiver.

The receiver is rigidly secured to an extension 61 of the receiver shaft 43, and rotates therewith, as will be later referred to.

The container support is rigidly secured to the lower ends of a pair of bolts 62 (see Figures 6 and 7) which extend and are slidable through the body of the receiver and are attached at their upper ends to a container support depressing bracket 63. Bracket 63 carries a cam roller 64 which is adapted to engage the platform depressing cam L as shown in Figure 7 to lower the container support at the infeed and discharging stations of the turret.

As shown in Figure 7, the body of the receiver is drilled out to provide spaced spring chambers 65, in which are carried relatively heavy springs 66 which engage and normally bias the bracket 63 upwardly, and thus tend to keep the container support 49 in its uppermost position.

The container support 49 is best shown in Figures 3 and 8. It has two spaced cylindrical openings 67 therethrough, Figure 3, and mounted for limited movement in each of said openings is a container platform 68. These platforms are biased toward their uppermost position, when they are level with the top face of the support 49, by springs 69, the lower ends of which are held by brackets 70 attached to the can platform. The upper surface of the container support 49 surrounding each opening 67 is covered with a thin stainless steel sheet 71.

From the above description, it will be apparent that when the roller 64 engages beneath the container platform depressing cam L, the bolts 62 are forced downwardly through the body of the receiver to lower the container support 49, as shown in Figure 7. At this time, the containers may be fed onto or removed from the platforms 68. Thereafter, when the cam roller 64 is no longer influenced downwardly by the container depressing cam L, the springs 66 cause the bolts 62 to be moved upwardly, thus elevating the container support upwardly toward the valve headers 53 and 54. When so moved upwardly, the projections 57 on the containers engage the gaskets surrounding the openings to the interior of the valve headers 53 and 54, and hold the valve 66 of the containers and the valves 56 of the headers open. The yielding mounting of the container platform 68 permits the receiver to accommodate itself to containers of different sizes, and to automatically compensate for slight variations in the dimensions of containers of a particular size.

As shown in Figure 8, the container support 49 has secured thereto a container centering bracket 75 having dual container positioning arms, one for each container on the platforms 68. These arms extend to the rear of the containers when they are positioned on the platforms 68, and are provided with straight inside and outside container centering faces 76 and 77, respectively, said faces being adapted to lie tangentially to the outside of the cylindrical containers when the same are positioned on the platforms against the bracket. When a pair of containers are centered on their supporting platforms by the bracket 75, the point where each centering face 76 is tangent to and touches the container will be 90° from the similar point of contact of the cooperating centering face 77. The planes in which the cooperating faces 76 and 77 lie are at right angles to each other, and perpendicular lines drawn from the center of these faces where they touch a correctly centered container will meet at the center of the platform 68. The faces 76 and 77 not only serve to center the containers on the platforms, but also assist in the discharging of the containers therefrom as will be hereinafter described.

Returning to Figure 3, the extension 61 of the shaft 43 is rigidly secured to the body of the container receiver as by means of nut 85. The movable valve plate 47 is preferably removably secured by screws 86 in a depression on the inner face of the receiver body, so that said plate may be replaced when worn. The outside of the fixed valve sleeve 39 beyond the inner end of the bracket B is threaded as shown, and a nut 87 serves to rigidly secure the fixed valve sleeve in place, the inner face of the fixed valve 40 being thereby tightly engaged with the outer face of the bracket B, so that the ports 45 and 46 constitute extensions of the auxiliary chambers 43 and 43', respectively, without there being any leakage from the chambers.

The inner end of the receiver shaft 43 extends beyond the fixed valve tube 39 and a collar 88 is mounted thereon and retained in position by means of the nuts 89. Collar 88 carries one ring 90 of a ball bearing, the opposite ring 91 thereof being pressed against the ball thrust bearings by the inner end of a spring 92, which surrounds the inner end of the fixed valve sleeve 39 and abuts at its outer end against the inner face of the nut 87. Thus, when the receiver and shaft 43 are rotated, collar 88 and ring 90 will rotate around the ball race, ring 91 remaining in fixed position. However, the inward thrust of spring 92 is transmitted to the valve shaft 43 and serves to tightly press the inner spherical face of the movable valve 47 against the corresponding spherical face of the fixed valve 40, preventing appreciable leakage along the faces of the valves.

When a pair of containers is fed onto a receiver at station F in Figure 1, the container platform will be depressed by the cam L, as shown in Figure 2, until it is level with the upper surface of the table 95 along which the conveyor passes. As the container support 49 is thus depressed, the containers, when fed thereon, will not engage the valve headers 53 and 54 which are thereby spaced from the container platform a distance greater than the height of the containers. Therefore, the header valves 55 will initially remain closed. At the time of infeed, the inner end of the passage 50 is in communication with the exhaust port 45 and through the auxiliary exhaust chamber 44 with the conduit 26 which leads to the main exhaust chamber 18 in the turret, this chamber being in communication with a source of vacuum, such as a vacuum pump or other device connected to the pipe 23 shown at the bottom of Figure 2a. After the containers have been fed onto the platforms 68 of a receiver, and as the turret revolves and carries the receiver in a clockwise direction away from the infeed station, as viewed in Figure 1, the container platform depressing roller 64 moves out from under the cam L, and springs 66 elevate the container support until the annular circular projections 57 on the containers contact and seal with the openings into the valve headers 53 and 54. At this time, the valves 55 are opened by the engagement of their depending projections 60 with the valves 56 of the containers as shown in Figure 3. The source of vacuum or suction is thus placed in communication, as previously described, with the head space of the containers, withdrawing air and gases therefrom.

Thereafter, as the turret revolves, the receivers are rotated to an inverted position by the inverting cam I', shown in Figure 1a, and as the inner end of the port 50 moves in a counter-clockwise direction around the outer face of the valve 40, as viewed in Figure 4, communication from the containers to the exhaust port 45 is closed, and immediately thereafter port 50 registers with the steam port 46 of the fixed valve 40. As previously pointed out, the steam port 46 is in constant communication with the steam chamber 43 in the bracket B, and this chamber is constantly in communication with a source of steam under pressure through the line 25, which enters the central steam chamber 21, shown in Figure 2a, the latter chamber being supplied with steam through the pipe 22 from any appropriate source. As the container receiver is caused to rotate with the shaft 43, and while the container valves are holding the valves 55 of the treating heads in open position, the communication of port 50 with steam port 46 causes steam under pressure to be forced into the containers, the supplying of steam beginning as the receivers are inverted, and continuing while they are maintained in their upside down position throughout the major arc of revolution of the turret. The steam treats and sterilizes the contents of the containers, and penetrates throughout all parts thereof.

As the continued revolution of the turret brings the particular receiver toward the discharging station D, shown in Figure 1, another cam I2 (Figure 1) causes the receivers to be again partially turned in a counter-clockwise direction on the shaft 43. This rotation of the receiver moves the port 50 beyond the end of the steam port 46, thus closing the supply of steam to the containers. The second receiver rotating cam I2 causes the receiver to be brought back to the upright position of Figure 3, and as the particular receiver reaches the discharging station D, the container platform depressing roller 64 again moves under the overhead cam L and depresses the platform 49 to the level of the table 95, so that a discharge mechanism, to be hereinafter described, can engage the containers and discharge them from the receiver. It will be evident that the depressing of the container platforms will also move the containers away from engagement with the valve headers 53 and 54, so that the valves 55 will return to closed position. The lowering of the containers away from the valve headers releases the pressure exerted on the container valves by the projection 60 on the header valves 55, and as a considerable pressure of steam within the containers will have been built up by the treatment previously described, this pressure keeps the container valves in closed position.

The containers are then removed from the turret and are mechanically clinched or sealed in a manner hereinafter described.

The construction of the apparatus previously described is principally adapted to treat containers of the valved type and their contents by preliminarily exhausting air and gases therefrom by suction, and then treating the product with steam under pressure. In some instances, however, it may be more desirable to follow a method as described in the copending application of David L. Loetscher, Serial No. 266,367, filed April 6, 1939, wherein the air and gases are exhausted from the head space of the containers in a different manner. In the said Loetscher application, a method is described in which steam under pressure is preliminarily injected into the head space of the containers for a short period of time, and this quantity of steam is then permitted to exhaust to atmosphere, carrying with it air and gases from the head spaces of the containers. The Loetscher process of exhausting air and gases has the advantage of not requiring accurate regulation of the degree of preheating of the product with the degree of vacuum or suction applied, as is necessary when the method of exhausting by vacuum or suction, previously described, is employed.

The present apparatus, including the container receivers and their chambered supporting brackets, can be utilized in carrying out the above mentioned Loetscher process by a simple modification of the ports in the stationary valve member 40. Figure 5 is a face view similar to Figure 4, of a modified fixed valve member 100 modified for practice of the Loetscher method. The steam port 101, similar to port 46, begins approximately 30 degrees in a counter-clockwise direction from the top vertical radius line of the face of the valve 100, and extends throughout almost the entire arc of the valve, having an end portion 102 extending just beyond said top radius line. Between the initial and terminating edges of the port 101, there is a relatively small exhaust port 103, similar to port 45, and extending through the fixed valve member 100. The use of this modified valve will not require any substantial changes in the apparatus previously described, for the only modification that need be performed, is the replacing of the sleeve 39 of Figure 3 with a different sleeve having a fixed valve 100 of the type shown in Figure 5 and described above. In the modified construction, the steam port 101 is in constant communication with the auxiliary steam chamber 43' in the bracket B, while the exhaust port 103 is in constant communication with the auxiliary exhaust chamber 44. The auxiliary steam chamber 43' is in constant communication with a source of steam under pressure through the conduit 25, and the auxiliary exhaust chamber 44 is in continuous communication with the turret exhaust chamber 18 through the conduit 26. The main turret chamber 18 may have any suitable means for relief therefrom to atmosphere. Referring to Figure 2a, the lower end of the pipe 23 which is in communication with the chamber 18 through the openings 24, may simply be open to atmosphere.

The operation of the modified apparatus is very similar to that of the embodiment completely illustrated in the drawings. When the containers are fed onto their supporting platforms on a receiver, said platforms are depressed by the overhead cam L. Thereafter, as the particular receiver leaves the infeed station in a clockwise direction as viewed in Figure 1, the heavy springs 66 on the receiver elevate the container platforms when the roller 64 leaves the cam L, bringing the protruding parts 57 of the containers into sealing engagement with their respective header valves, as previously described. At this time, the inner end of the passage 50 is in communication with the upper end 102 of the steam port 101 (Figure 5) which extends beyond the upper central radius of the fixed valve 100. When the container supporting platforms force the container valves into sealing engagement with the valve headers and thus open the header valves 55, there is an injection of steam under pressure into the head space of the containers. The period of this injection may be quite short, as described in the said Loetscher application, and is immediately terminated when the receiver begins to rotate with the shaft 43 in a counter-clockwise direction (Fig. 5) as the turret revolves. The receiver is rotated by the came II (Fig. 1a) on the turret track as heretofore mentioned, and as the valve face 47 of the receiver turns with respect to the fixed valve face 100, the preliminary steam injection is cut off and the inner end of the passage 50 moves past the exhaust port 103. As the end of passage 50 crosses port 103, the steam in the head space of the containers is exhausted to atmosphere, passing outwardly through port 103, exhaust chamber 44, conduit 26, and from turret exhaust chamber 18 to atmosphere. The steam so exhausted carries with it gases and air from the head space of the containers.

Thereafter, further rotation of the receiver toward its inverted position brings the inner end of passage 50 into register with the steam port 101, and steam under pressure is forced into the container during the time the receiver is being inverted, and while it is inverted, it being evident that when the receiver is inverted, the inner end of passage 50 is at the lower portion of the arc of port 101, as viewed in Figure 5.

The steam treatment is continued throughout substantially the entire revolution of the turret, and as the particular receiver approaches the discharging station, it is reverted to its upright position by being again rotated in a counter-clockwise direction, looking toward the center of the turret, by the came I2 (Fig. 1). During the reverting rotation, the end of passage 50 moves throughout the right hand arc of the port 101, as shown in Figure 5, until it reaches the upper end 102 of said port. The steam treatment thus continues, in this modified construction, until the containers have been reverted to upright position, at which time the particular receiver will be entering the discharging station. Upon arrival at the discharging station, the roller 64 moves in under the overhead cam L, thus depressing the container supporting platforms and thereby cutting off communication from the source of steam under pressure to the interior of the containers, by the automatic closing of the header valves 55 when the containers no longer contact the valve headers.

The containers are then removed from the receiver at the discharging station and their valves are sealed or clinched, the container valves being held in closed position by the steam under pressure within the containers until the mechanical sealing or clinching operation is carried out.

Referring more particularly to Figure 6, the inner face of the body of the receiver carries a plurality of inverting rollers 105, these rollers being mounted for turning movement on stub shafts 106 attached to the body of the receiver, the centers of the shafts being equally spaced from the center of the shaft 61, to which the receiver is secured. The rollers 105 are equally spaced from one another throughout a circle having its center at the center of the shaft 61. There being six of these rollers shown, they are spaced sixty degrees apart through said circle.

As shown in Figures 2 and 2a, an upwardly and outwardly extending casting 107 is secured to the frame or foundation of the machine, and terminates at its upper end in a circular level track 108 extending throughout the periphery of the machine. The surface of this track is spaced below the top surface 19 of the rotary turret, and the rollers 105 carried on the inner face of the receivers roll along this track as the turret revolves. From Figure 6, it will be evident that the two lowermost rollers 105 will roll along the track 108 when the receiver is in upright position, as it is when it enters and leaves the discharging and infeeding stations. The two uppermost rollers 105 shown in Figure 6 will likewise roll along the track 108 during the major portion of the revolution of the receiver with the turret, when the receiver is in inverted position.

The cams I1 and I2 for turning the receivers are shown in detail in Figures 10 and 11. These two cams, located respectively adjacent the infeeding and discharging stations, are identical, and comprise a first tooth 110, and a second tooth 111 spaced therefrom by an opening 112. Figure 11 is a view of the section of the track 108 in which the receiver turning cam is inserted, looking toward the center of the turret. In this view, the receivers would approach the cam from the right. Immediately before the first tooth 110 there is an arcuate groove 113 extending below the top surface of the track 108. The bottom of the opening 112 is likewise arcuate, and extends to the same depth as groove 113. Similarly, beyond the second tooth 111, there is a final groove 114, of the same depth as the groove 113. The bottoms of the grooves or depressions 112, 113, 114 have the same curvature as that of the receiver rollers 105, and said grooves permit the receivers to pass the turning cams, the grooves successively receiving adjacent rollers 105 on the receiver.

Figures 12 through 16 diagrammatically illustrate the manner in which the cams I1 and I2 turn the receivers through 180 degrees. These diagrammatic views are intended to illustrate the movements of a receiver looking from the outside of the machine toward the center of the turret, and they illustrate identical operations involved either when the receiver is being changed from upright to inverted position, as it leaves the infeed station, or when it is being changed from inverted to upright position as it approaches the discharging station.

In Figure 12, the receiver is shown approaching the first tooth of the cam in a direction from right to left. As it approaches, the rollers 1 and 6 are rolling along the track 108. When roller 1 engages the first tooth of the cam, further movement of the receiver tends to rotate it on its axis, and the roller 1 is forced down into the first depression, as shown in Figure 13, thus turning the receiver through an angle of 30°. Thereafter, further movement of the receiver from right to left brings the roller 2 down into the second groove between the two teeth, as shown in Figure 14. The receiver has now rotated or turned through 90°. Upon further translation of the receiver from right to left, the roller 2 is moved out of the middle groove and the roller 3 is forced to enter the final groove beyond the second tooth, as shown in Figure 15. The receiver has not turned through 150°. The final movement of the receiver beyond the cam turns the receiver through a final angle of 30° in getting the roller 3 out of the final groove, and onto the track 108, as shown in Figure 16. Thus, the receiver is successively turned through 180° by each of the cams I1 and I2 which are fixed in the trackway 108 at positions shown in Figures 1a and 1.

It will be noted by comparison of Figure 4 with Figures 12 and 13, that the initial turning movement of the receiver which brings the roller 1 directly beneath the center of the receiver, is sufficient to move the inner end of the passage 50 from exhaust port 45 over into register with the steam port 46, so that the steam treatment commences substantially as soon as the head begins to rotate on its axis.

Referring to Figure 5, it will be apparent that the initial turning movement of the head from its position of Figure 12 to that of Figure 13, carries the end of passage 50 from its position at the upper end of the steam port 102 for preliminary steam injection, completely past the exhaust port 103 and again into register with the steam port 101. Therefore, in using the modified valve 100, the step of exhausting the steam is a relatively instantaneous one, for the port 103 is quickly closed before there is opportunity for air to filter back into the head space of the containers.

From a consideration of the movements of the receiver, with respect to the specific design of the ports in the face of the valve members 40 and 100, it will be evident that the time of exhaust and steam injection may be minutely controlled by the design of these ports. The timing of the treatment may be adjusted by substituting different fixed valve faces. The time of treatment may also be controlled by the relative position of the cams I1 and I2 on the turret trackway 108, and by the length or position of the container platform depressing cam L, which does not permit communication between the respective valve headers and the containers, until the roller 64 has moved away from engagement with said cam. However, the most convenient control of the process resides in the variable speed transmission device V which can control the speed of rotation of the turret and thus the time of treatment of the product.

From the above description, it will be evident that the cam I1 adjacent the infeed station inverts the receiver through 180°, controlling the registration of the passage 50 with the exhaust and steam ports. It will be further evident that as the particular receiver approaches the discharging station, the other cam I2 reverts the receiver back to its upright position, thereby controlling the termination of the steam injection into the container in the embodiment of Figure 4. In the modification of Figure 5, the steam treatment may continue until the containers are lowered from their treating heads.

*The simultaneous infeed of groups of containers*

The construction of the turret and container receivers which permits simultaneous reception and treatment of a group of containers, has been described above. The advantages of such construction are obvious, one being the conservation of space on the turret, permitting a greater number of containers to be treated in a given period of time, and another being the reduction of duplicated parts which would be present if a complete receiver and bracket were utilized for each container.

In order to feed containers to receivers of the type described, a special infeed mechanism is necessary. As mentioned above with reference to Figure 1, the containers are fed in a line to the infeed station of the machine by a continuously moving conveyor C. This conveyor may be driven in any suitable manner from the main drive of the turret, its speed being coordinated in any well known manner in accordance with the design and movement of the turret and other cooperating parts.

In Figures 1 and 2, the conveyor is shown comprising two spaced continuously moving chains 120 which move through grooves 122 in the table surface 95 of a housing 126 which accommodates the conveyor and serves as a support for the infeed and discharge mechanisms. The housing 126 is attached to the base 10 of the machine as shown in Figure 2. The chains 120 of the conveyor move over end sprockets 127 and 128 journalled for rotation in any appropriate manner in the housing 126. In the preferred form of the invention portrayed in Figure 1, the conveyor only extends to a point beyond the infeed plunger to be later described.

As shown in Figure 2, the housing 126 includes a portion 129 constituting an enclosure for the main cam drum 130 of the machine. The outer open end of the housing 129 is covered by a plate 131 bolted thereto, said plate having a central inside boss 132 which houses a bearing 133 for the outer end of the main cam drum shaft. The main cam drum shaft is shown at 134, and it has a reduced outer end 135 to which the main cam drum 130 is keyed. The shaft 134 has a bearing in the housing 126 as shown at 136. Shaft 134 is driven by double chains 137 (Fig. 1) which extend from a double pulley 138 on the outer end of the drive shaft 140 and connect with a double pulley 142 on shaft 134. Drive shaft 140 is a continuation of the turret drive shaft 29 shown in Figure 1a.

The main cam drum 130 is cut away as shown at 143 to reduce its area to the minimum required for the operations which it performs. In the outer face of the drum, a cam groove 144 is provided. Groove 144 serves to reciprocate a cam follower roller 145 located therein, back and forth at right angles to the conveyor C beneath the table 95 as the drum rotates. The size and design of the cam drum and the size of the various drive connections described above will be such that the cam drum 130 is operated in coordinated timed relation with the turret T so that the infeed mechanism to be later described operates at proper time to feed containers onto the turret receivers when said receivers are in proper location at the infeeding station.

Secured to the upper face of the table 95 is a hollow sleeve 146, and mounted for longitudinal reciprocating movement within said sleeve is a cylindrical feed plunger 147.

A longitudinal slot 149 extends through the lower side of the sleeve 146, which slot lies over a corresponding slot through the table 95, and a cam follower 150, which is secured to the bottom of the feed plunger 147 and also to the cam roller 145, is adapted to reciprocate back and forth in the groove 149. With this construction, the feed plunger is adapted to be moved back and forth by the cam roller 145 as the cam drum 130 is turned. Secured to the inner end of the feed plunger is a flexible pusher arm 151, which is long enough to engage a pair of containers on the conveyor C and push them across the surface of the table 95 and onto the platforms of a container receiver. The pusher arm 151 bends slightly inwardly toward the turret from its attached to its outer end, to compensate for the curvature of the turret at the point of infeed.

It will be apparent from the above description that the feed plunger and pusher arm operate to periodically feed groups or pairs of containers onto the turret. Those skilled in the art will understand that in machines of this character, when containers arrive at the machine on a straight line conveyor, the containers may be more or less unevenly arranged thereon. The preceding operations, such as filling the containers, etc., may have been performed in such manner that there are gaps between containers on the continuously moving conveyor. It is, therefore, essential to provide means to insure that the containers are arranged in groups in side-by-side relation, so that they can be fed while in this arrangement into the receivers. It would be undesirable to only charge one of the container platforms of a particular receiver, and, furthermore, it might be difficult to position only one container so that it could be accurately placed on a receiver. An improperly fed container might jam the machine, or cause the undesirable casualties, such as forcing the header valves open and permitting hot steam to exhaust out into the atmosphere. Therefore, I have devised means hereinafter described for arranging the containers in groups or pairs so that they can be fed in this manner into the container receivers.

The means here referred to includes a gate extending over the infeed conveyor which does not open unless two containers are present against it. When this gate opens, the containers are moved forward by the conveyor to position to be fed into the turret receivers by the infeed plunger.

As previously described, the infeed plunger cylinder 147 is continuously reciprocated back and forth by the rotation of the main cam drum 130. In one side of the fixed sleeve 146 there is a slot 160 which is of the same length as the cam follower slot 149 previously referred to. Secured to the infeed plunger 147 and adapted for reciprocating movement therewith in the slot 160 is a latch carrier 161. The member 161 carries a latch 162 which is horizontally pivoted thereto.

Attached to the machine frame on the table 95 is a channel member 163 and mounted for horizontal reciprocation therein toward and from the turret is a slide 164. Attached to the slide 164 is a bracket 165 which carries a gate 166 adapted to extend inwardly across the conveyor C, as shown in Figure 1. The pivoted latch 162 is provided with a latching arm 167 which is adapted to fall down and engage an abutment 168 secured to the slide 164, as shown in Figure 17. When the latching arm 167 is in its lower position in engagement with the abutment 168, the outward movement of the infeed plunger 147 will also cause slide 164 to move outwardly, thus carrying the gate 166 back from the conveyor to the dotted line position of Figure 17. Such retracting of the gate permits the continuously moving conveyor C to carry the containers which were behind the gate, forward into position to be engaged by the infeed arm 151 when the infeed plunger subsequently moves inwardly. This outward movement of the gate 166 is, of course, a result of the outward movement of the infeed plunger 147, which carries the infeed arm 151 to a point outside of the conveyor, so that when the main cam next moves the infeed plunger 147 inwardly toward the turret, the pusher arm 151 will engage the two containers previously released by the gate 166 and will push them into the turret receiver. It will be noted in Figure 17 that the pusher arm 151 is bent inwardly toward the turret, so that it lies substantially parallel with the arc through which the container platforms pass on the turret. This is necessary as will be apparent from Figure 1, which shows that the infeed is performed when a receiver has just passed beyond the side center line of the machine.

When a pair of containers are thus fed into a receiver on the turret, they will be guided to an exact central position on the container supporting platforms by the faces 76 and 77 on the centering arm 75, as shown in Figure 8.

On the return or inward stroke of the infeed plunger 147, the engagement of the latch carrier 161 with an upstanding pin 170 on the slide 164 moves the slide and gate 166 back to their inward position where the gate again forms a blockade across the conveyor. The speed of the conveyor is so related to the movement of the gate 166 and the pusher arm 151 that, when the gate is retracted, two containers are moved forward far enough to be engaged by the pusher arm 151, and the gate 166 returns to position across the conveyor in time to prevent any more than two containers from passing beyond the gate.

The present invention provides mechanism responsive to the presence of two containers immediately behind and against the gate 166 to drop the latching arm 162 into engagement with the abutment 168 on the slide 164 so that the slide and gate may be moved outwardly by the reciprocation of the infeed plunger 147. If there is only one or if no containers are present against the gate 166, the latching arm 162 will remain elevated out of engagement with the abutment 168 and the slide 164 will not partake of the movement of the infeed plunger 147.

The mechanism referred to above comprises a trip finger having opposite curved arms 171 and 172, which is pivoted at 173 to the end of a rod 174. The rod 174 is carried by a bifurcated member 175, the arms of which embrace and are horizontally pivoted to said rod, member 175 being rigidly secured to a rock shaft 176 (Figures 17 and 19) which is supported for rocking movement in a bracket 177 secured to the table 95 of the machine. Rock shaft 176 is also journalled in a bearing block 178 secured to the frame of the machine, and at its inner end it carries an upstanding finger 179 which is positioned to be engaged by the lower edge of the gate 166 when the gate is retracted, as discussed above. When the finger 179 is depressed by the rearward movement of the gate 166, the shaft 176 is rocked and the bifurcated member 175 is likewise turned outwardly, thus imparting a slight outward movement to the rod 174, this movement serving to carry the trip fingers 171 and 172 out of contact with the containers to permit them to be freely moved forward by the conveyor.

The outer end of the rod 174 is pivoted to the end of one arm 180 of a lever which is pivoted to the frame of the machine at 181. A spring 182 is secured to the lever 180 at one end and at its other end it is secured to the frame of the machine at 183. With the above construction, when the gate 166 again moves inwardly, as previously described, its lower edge will move out of engagement with the upstanding finger 179 and permit the spring 182 to carry the rod 174 inwardly to replace the trip finger in position for engagement with the containers behind the gate 166.

The lever pivoted at 181 has another arm 184 extending toward the feed plunger sleeve 146, and this arm has a downwardly depending end 185 which carries a roller 186.

Roller 186 normally rides upon an elevated ledge 187 on the outer arm 188 of a track which is pivoted at 189 to any fixed member of the frame, such as to the side of the channel member 163. The opposite arm 190 of the pivoted track supports a second arm 191 which is integral with the pivoted latch 162, the arm 191 having a roller 192 which is adapted to move along the top of the pivoted track 190.

When there are no containers present behind the gate 166, the spring 182 will keep the lever arm 180 moved inwardly, which will maintain the other lever arm 184 in an outer position, so that the roller 186 will surmount the ledge 187 on the pivoted track, thus depressing arm 188 and elevating arm 190 of said track. The elevation of the track arm 190 will cause the arm 191 to be raised to its upper position, as shown in dotted lines in Figure 18, and the latching arm 162 will likewise be elevated out of engagement with abutment 168 on the slide 164. When the mechanism is thus arranged, the slide 164 will not partake of the outward movement of the infeed plunger 147. As pointed out above, the trip finger is loosely pivoted at 173 to the end of the rod 174, and a single container moving forward on the conveyor to the gate 166 can easily pass first by the arm 171 of the trip finger, moving it outwardly about the pivot 173, and then by the other arm 172 of the trip finger by again moving the finger about its pivot.

The top of the conveyor carries an inner side wall 193 along which the containers are moved by the conveyor, as shown in Figures 1 and 17. When one container has arrived at the gate and a second container is later brought forward by the conveyor, this second container strikes the arm 171 of the trip finger and moves it outwardly to a limited extent, but the trip finger is so spaced from the wall 193 that a second container cannot be moved into contact with the first arrived container by movement of the trip finger around its pivot 173. When the second container arrives, the arm 171 can only yield outwardly until the other arm 172 of the trip finger engages the first arrived container, which will not yield because it is in contact with the wall 193. Therefore, as the second container continues to move forward, assisted by the pressure of succeeding containers behind it, the arm 174 is forced outwardly, thus moving lever arm 180 outwardly and lever arm 184 inwardly, and the roller 186 drops down off of the ledge 187 on the outer end of the track 188. Arm 191 then drops downwardly and the latching arm 167 engages the abutment 168 on the slide 164, all resulting in the withdrawal of the gate 166.

Therefore, as long as two containers are not properly positioned behind the gate 166, the arm 190 of the track is in its upward position and reciprocation of the infeed plunger 147 only causes the bracket 161 to move back and forth, with the roller 192 riding along the track 190.

As long as two containers are present behind the gate 166, the rod 174 is held in its outer position and the roller 186 is kept down off of the ledge 187 on the outer end of the pivoted track. As a result, the infeed plunger 147 continues to be latched to the slide 164 to reciprocate the gate back and forth.

In Figures 17 through 19, I have shown the infeed plunger 147 equipped with a bent arm 271 to provide for simultaneously discharging the containers from the turret in pairs. This discharging arm and the means by which it is connected with the infeed plunger are separate from and are not a part of the preferred infeed mechanism disclosed in Figure 1. In the preferred embodiment of the machine, which is now being described, separate infeed and discharging mechanism are provided, so that the bent discharging arm 271 of Figure 17 is not required.

The mechanism for operating the gate 166 and the infeed plunger 147 is the same whether or not the bent discharge arm 271 is used. The particular mechanism employed when the bent discharge arm is associated with the infeed plunger will be described later in connection with the combined infeed and discharge modification of the apparatus of this invention.

*The container discharging mechanism for spacing the containers of a group for individual sealing*

Referring to Figure 1, the container sealing device or clincher S is shown as an individual unit located at the discharging station of the turret. The construction of the clinching device need not be described in detail herein, it being sufficient to say that it comprises means for elevating the containers so that the upstanding projections thereof are engaged by a chuck which crimps the projections beneath the valve of the container to permanently seal the same.

The clinching device is generally illustrated in Figures 20 and 21, as comprising a chuck 200, which engages and crimps the projections on the containers when the latter are moved upwardly on a vertically movable platform 201.

Referring to Figure 22, the chuck may generally comprise a fixed spindle 203 secured to the frame of the machine, which carries depending spring-like jaws 204 adapted to engage the sides of the projection from the container and crimp the same beneath the valve member of the container to seal the same, as is well known in the art. The jaws 204 are moved inwardly by a circular cam 205 attached to a sleeve 206 which is connected with brackets 207 movable upwardly about a sleeve 208 carried on the fixed spindle 203. The spindle carries at its lower end a spring pressed plunger 209 adapted to contact the upper end of the projection from the container.

Referring again to Figure 20, the clinching unit is driven by a shaft 210 journalled in the frame of the machine, which shaft carries an eccentric 211 which reciprocates a strap 212 pivoted at 213 to a vertically movable block 214, said block reciprocating within a housing which is integral with the frame of the machine. The container platform 201 is carried by the block 214 but is yieldingly mounted thereon, as shown, to compensate for variations in the lengths of successive containers. The construction of the clinching unit is similar in its general manner of operation to that shown in Figure 10 of the above mentioned Mills Patent No. 2,054,092.

As in the Mills patent, a pair of rods 215 connect the reciprocating block 214 with the sleeve 201. When said sleeve is moved upwardly by the eccentric, the clinching fingers seal the valve of the container.

Shaft 210 is driven by a chain which engages the pulley 220, said chain being driven from a drive pulley 221 carried by the drive shaft 140, as shown in Figure 2.

As the clinching unit S is constructed to operate individually upon the containers and as pairs of containers are carried in side by side relation on the turret, it is desirable to space them as they are fed to the clinching unit to permit the latter to perform its individual clinching operation.

To remove the pairs of containers from the turret, and to space them preliminary to the clinching operation, I have devised the star wheel discharge mechanism disclosed in Figures 1, 20, 23 and 24. The star wheel 230 is carried by a vertical shaft 231 (Fig. 20), journalled for rotation in the frame of the machine, and shaft 231 carries a bevelled gear 232 at its lower end, which gear is driven by a meshing beveled gear 233 carried by a horizontal shaft 234 also journalled in the frame of the machine. Shaft 234 is driven by a pulley 235 secured thereto, which pulley is driven by a chain which connects the same with a drive pulley 236 shown in Figure 2.

Figure 24:
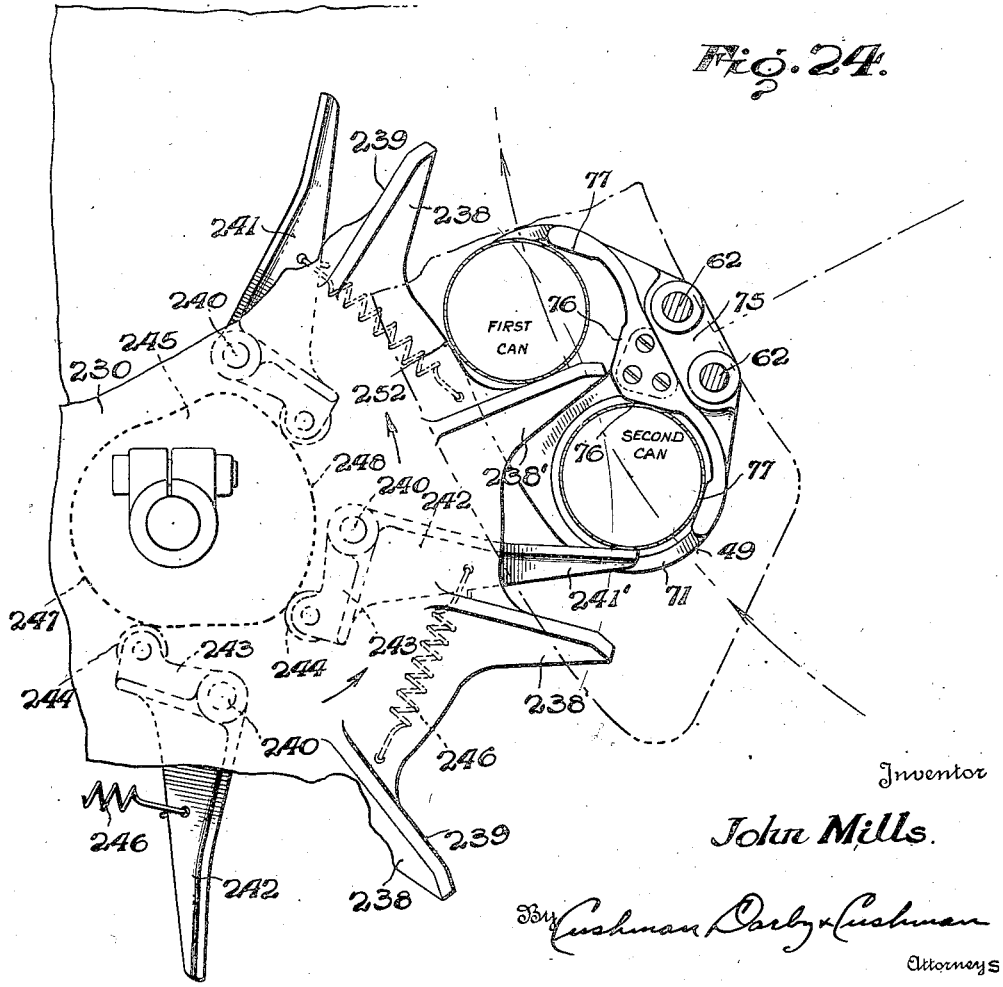

Referring to Figures 1 and 24, the star wheel 230 is equipped with a plurality of fixed teeth 238, said teeth having flat forward container engaging faces 239. Any convenient number of such teeth may be used, but in the present design I have shown a star wheel equipped with ten fixed teeth. Pivoted to the under face of the star wheel at points 240 are a plurality of oscillating or rocking container engaging teeth 241. The rocking teeth have one long arm 242 which extends outwardly beneath the star wheel slightly beyond the outer ends of the fixed teeth 238, and a short cam engaging arm 243 which is substantially at right angles to the arm 242. The arms 243 carry cam rollers 244 which engage a cam 245 which is fixed to the top of the frame of the machine beneath the star wheel as shown in Figure 20.

There are half as many rocking teeth as there are fixed teeth on the star wheel, and they are evenly spaced so that there is a rocking tooth which cooperates with each alternate fixed tooth on the star wheel. Any suitable means such as springs 246 are provided to keep the rollers 244 against the surface of the cam 245. The cam 245 is circular throughout substantially half of its periphery, as shown at 247, and when the cam roller 244 of a particular rocking tooth is on the circular portion of the cam, the rocking tooth is substantially in alignment with its cooperating fixed tooth. The star wheel is rotated in a counter-clockwise direction, as viewed in Figure 1, and as the rollers 244 of the rocking fingers move upwardly onto the expanded portion 248 of the fixed cam, the outer end of each rocking tooth is advanced ahead of its cooperating fixed tooth. The arrangement of the star wheel is such that as the teeth approach the rotary turret, the line of rotation being indicated diagrammatically in Figures 23 and 24, the outer ends of the rocking teeth are moved forwardly of their fixed teeth as shown, for a purpose which will be hereinafter apparent.

Figure 23 shows the beginning of the operation of removing a pair of containers from their support 49 on one of the container receivers of the turret. The containers are properly centered on their respective platforms, being in engagement with the flat tangent surfaces 76 and 77 of the container centering bracket 75.

The construction and timing of the turret and its receiver and of the star wheel is such that one of the fixed teeth 238' moves in between the containers of a pair as shown in Figure 23, as the container receiver meets the star wheel. As the leading fixed tooth 238' and the container receiver sweep by one another, said tooth moves further into the space between the two containers, as represented in Figure 24. The fixed tooth, in moving into the space between the two containers, keeps the first container tightly pressed against the tangential face 77 on the container centering bracket 75, and as the leading end of the centering bracket begins to diverge from the fixed tooth 238', by reason of their different paths of rotation, the container being removed is initially pushed from the position of Figure 23 to the position of Figure 24, so that the first container is forced completely into the pocket of the star wheel ahead of the fixed toooth 238', and into contact with the inner edge of the pocket, as at 252. Thereafter, further diverging movement of the tooth 238' from the path of the container receiver carries the first container out onto the surface of the table 95.

At this time, as indicated in Figure 24, a particular rocking tooth 241', which has been advanced through a given angle from its fixed tooth 238, will come into engagement with the second container of the pair. Thereafter, in a manner of operation similar to that described above in connection with the fixed tooth, the oscillating tooth 241' pushes said second container into its pocket and carries it out over the table 95. As in the case of the first removed container, the tangential surface 76 on the side of the second pocket assists in guiding the can outwardly, so that it is forced completely into the pocket ahead of the rocking tooth 241' as said tooth carries the container away from the turret.

Turning now to Figure 1, the relative position of the two containers of a pair is shown. As indicated, the first one of a pair is being carried counter-clockwise by the fixed tooth 238 of the star wheel, while the second container of a pair is being conveyed by a rocking tooth 241. As the rotation of the star wheel continues, the cam roller on the rocking tooth will leave the expanded surface 248 of the fixed cam and will move inwardly toward the reduced circular portion 247 of said cam, permitting the rocking tooth spring to move the rocking tooth rearwardly toward its trailing fixed tooth. The fixed tooth which conveys the first container of a pair, will feed said container to the clinching device S, and when the second container of a group reaches the clinching device, it will have been dropped back relatively to the first container until it is carried by its fixed tooth. As the containers reach the clinching unit, a removing finger 258 on the clincher, which extends out over the fixed teeth of the star wheel, engages the containers and guides them into proper position on the clinching unit.

Figures 27 and 28 are detailed views of the container receiver platform depressing cam L. This cam is carried by a bracket 260 which is supported in any suitable manner on the machine frame over the infeed and discharging stations, as by the supporting members 261 and 262 shown in Figure 20. In Figure 27, the center line of the machine from the center of the turret through the axis of the main cam drum 130 is indicated by the line 263. The cam L is arcuate, having its center of curvature at the center of the turret, and it lies above the circle which the container receiver platform depressing rollers 64 describe as the turret revolves. The cam bracket is positioned on the frame so that the leading edge 264 of the cam is located far enough in advance of the center line 263, so that the container supporting platforms on the receivers are depressed before the receivers bring their containers to position where they are engaged by the teeth of the star wheel. On the other hand, the trailing edge 265 of the cam is positioned only a relative short distance beyond the center line 263, so that immediately after a pair of containers are pushed onto the receiver, the supporting platforms thereof will be elevated to commence the treatment of the product.

Figure 1 shows the complete star wheel as it is associated with the rotary turret. Two containers marked 1 and 2 are shown just after they have been removed from a receiver which has just passed beyond the periphery of the star wheel. The first of these containers is carried by a fixed tooth while the second is carried by one of the rocking teeth, as previously described. Behind the two containers marked 1 and 2, another first container of a pair is being engaged by a fixed tooth, while the following rocking tooth has not yet come into engagement with the second container of the last mentioned pair. The complete operation of the star wheel is illustrated in Figure 1, and successive positions of the teeth indicate how the rocking teeth move rearwardly toward their respective fixed teeth as the clinching device is approached, until the containers carried thereby are engaged by the cooperating fixed teeth prior to the time when they are taken from the star wheel by the clincher removing finger 258.

The design and timing of the star wheel is coordinated with the design and timing of the clincher, so that the clincher can individually seal successive containers and provide for their removal in any well known manner in the time between the arrival of successive fixed teeth on the star wheel.

It will be apparent that the star wheel container discharging device described above will remove the pairs of containers from the receivers on the turret, and will accurately space them as they are conveyed to the clinching unit so that the latter may operate individually upon spaced containers which arrive at the clincher at even intervals of time.

Combined infeed and discharge

In Figure 25, a modified arrangement for discharging the containers from the turret and for clinching them in pairs, is illustrated. The infeed mechanism including the gate 166, the pusher arm 151, and their operating means, is identical with that described in connection with Figure 1. However, instead of employing an individual clinching unit S, a double clincher SS is employed which seals a pair of containers simultaneously. The conveyor C' is arranged in the same manner as in Figure 1, except that it is longer and serves the additional function of carrying the containers away from the clinching device. The table 95, through which the conveyor passes, is extended as at 95', and the forward pulley 128' over which the conveyor chains pass, is located a considerable distance beyond the position of the pulley 128 of Figure 1.

Referring to Figure 17, the infeed plunger 147 is operated in the same manner as described in connection with the principal embodiment of the invention, but mounted for longitudinal sliding movement through the plunger 147 is a container discharging rod 270 which extends beyond the inner end of the plunger 147 and carries at its end a bent arm 271 adapted to simultaneously remove a pair of containers from a receiver of the turret. The outer end of the rod 270 connects with a plate 272 which engages the outer end of the fixed sleeve 146. A bushing 273 is fitted within the inner end of the cylinder plunger 147, and there is a spring 274 surrounding the rod 270 which is compressed between the inner end of the bushing 273 and a collar 275 fixed to the rod 270. An adjustable screw 276 may be provided extending through the end plate 272 carried on the end of the rod 270, for a purpose hereinafter apparent.

With the above modified construction, cam drum 130 drives the infeed plunger 147 in the manner previously described. Initial outward movement of the plunger 147 will retract the infeed arm 151 which is attached to the plunger, but it will not immediately move the bent discharging arm 271 outwardly with respect to the turret, for as the cylinder 147 moves outwardly, spring 274 acting against the collar 275 holds the rod 270 and the discharging arm 271 at its inner position.

However, when the inner end 277 of the plunger 147 contacts the end plate 272 or the adjustable screw 276 extending therefrom, further outward movement of the plunger carries the rod 270 with it, thus causing the bent arm 271 to remove the containers from the receiver outwardly as far as the conveyor C.

The screw 276 can be adjusted so that when the plunger 147 makes its complete outward movement, the bent arm 271 moves a regulated distance less than the complete outward movement of the plunger 147.

Referring to Figure 26, the bent discharging arm 271 is so positioned that it engages behind the containers above the receiver centering finger 75, so that there is no possibility of the discharging arm encountering any of the parts of the turret.

Similarly, when the plunger 147 begins its inward movement, the initial portion thereof immediately effects the rod 270 and the bent arm 271. The bent discharging arm 271 moves inwardly with the cylinder 147 until the end plate 272 on the rod 270 strikes the end of the sleeve 146, at which time the inward movement of the arm 271 is terminated. Thus, the forked discharging arm is rapidly brought back to its inward position in order to receive the succeeding pair of containers which are being then brought to the discharging station by the revolution of the turret.

The construction and operation of the combined infeeding and discharging mechanism described above is such that the bent arm 271 removes a pair of containers from a particular receiver on outward movement of the feed plunger 147. This outward movement of the feed plunger will, if a pair of containers are present behind the gate 166, cause the gate to be retracted to permit the conveyor to move an additional pair of containers forward into infeeding position. Thereafter, on the succeeding inward stroke of the feed plunger, the pusher arm 151 forces the containers present on the conveyor ahead of the gate into the same receiver from which the bent arm 271 had just removed a pair of containers. Immediately preceding the above mentioned infeeding operation, the bent arm 271 will have been moved inwardly in time so that it will pass behind the pair of containers on the next succeeding receiver of the turret entering the discharging station. The timing of the various parts is such that the above operations may be accomplished, and the design and operation of the bent discharging arm 271 is such with respect to the position and movement of the receivers on the turret, that said arm is able to pass back between the successive receivers in order to again be ready to discharge a pair of containers from the succeeding receiver.

The pusher arm 151 is sufficiently flexible so that if any obstruction is encountered during its operation, no serious damage will result. Furthermore, the flexible mounting of the discharging arm 271 is also such that shocks resulting from any containers being out of place will not damage the machine.

As shown in Figure 26, the bent discharging arm 271 engages the containers on a receiver after the container supporting platforms thereof have been lowered by the overhead cam L, and removes the pair of containers in side-by-side relation outwardly to a position in line with the conveyor C' beneath the double clincher SS. The double clincher is of conventional construction, except that it can operate simultaneously on a pair of containers, whereas clinchers of the prior art have been constructed for only individual operation.

The discharging arm 271 carries the pair of containers out onto a pair of vertically movable platforms 280. Only one of said platforms is in view in Figure 26, as they are situated side-by-side along the line of the conveyor. The platforms 280 are mounted for reciprocation through a pair of openings 281 in the top of the conveyor table. The platforms have spaced longitudinal grooves 282 therein, so that when they are moved upwardly, the chains of the conveyor can be received in said recesses without lifting the same. Each supporting platform 280 is carried on a rod 284 mounted for limited vertical movement in a reciprocating block 285. A spring 286 normally maintains the platform in its upper position. The block 285 is attached to a tubular member 287 adapted to reciprocate vertically through a cylindrical bore 288 which extends upwardly through the frame of the machine.

Secured to the reciprocating tube 287 is a bracket 290, and said bracket carries an abutment 291 which contacts a cooperating abutment 292 on a sleeve 293 of the double container clinching device SS. Only one of the units of the double clincher is in view in Figure 26, the other of said units being behind the one there shown. The clinchers are carried by the frame of the machine, and they have chuck members which are contracted by movement of sleeves 293 to clinch and seal the container valves when the containers are moved up into engagement therewith, in the manner previously described.

The tube 287 is reciprocated to elevate the container platforms 280 through the conveyor and to operate the double clincher by any suitable means. For example, in Figure 26, the end 300 of a bell crank operating lever (not shown) is pivoted to a connecting link 301 which extends up into and is pivotally connected with the tube 287 at 302. The operating bell crank lever may be centrally pivoted to the frame of the machine, and its opposite end may be provided with a cam roller which engages an auxiliary cam (not shown) on the inner face of the cam drum 130. With such an arrangement, the tube 287 may be reciprocated in timed relation with the movements of the turret and container discharging mechanism to elevate and clinch the containers in pairs, and to then lower them onto the continuously moving conveyor C' which carries them away from the machine.

It will be obvious that the mechanisms disclosed herein for accomplishing the various objects of the invention are capable of considerable modification without departing from the invention.

I claim:

1. In a machine of the class described, a revoluble turret, a fixed station adjacent the path of revolution of the turret for charging containers onto the turret from a conveyor, a supporting member mounted for revolution with said turret adjacent the periphery thereof, a container receiver pivotally carried by said supporting member for rotation thereon, said receiver having a flat container supporting platform on which the base of a container may rest, said platform being mounted on said receiver for vertical movement, means for moving said platform to a position level with the conveyor when said receiver reaches said charging station, means coordinated with the revolution of said turret for rotating said receiver and said platform on said supporting member between upright and inverted positions, means for supplying fluid under pressure to the interior of the container in the receiver to treat the contents thereof, and means operable by the rotation of said receiver with respect to said supporting member for controlling the supply of fluid to the container.

2. In a machine of the class described, a revoluble turret, a fixed station adjacent the path of revolution of the turret for discharging containers from the turret to a conveyor, a container receiver mounted on said turret for revolution therewith, said receiver having a chamber adapted to communicate with the interior of the container to treat its contents with fluid under pressure, and having means for forming a seal around the opening in the container when said chamber communicates therewith, said turret having means for supplying fluid under pressure to said chamber, said receiver being pivotally mounted on said turret for turning movement thereon, said receiver having a flat container supporting platform on which the base of a container may rest, said platform being mounted on said receiver for vertical movement, to clamp the margins of the opening in the container against said seal forming means, means coordinated with the revolution of said turret for turning said receiver between upright and inverted positions, means operable by the turning of said receiver for opening and closing communication between said supply means and said chamber, and means on said turret for moving said platform to position level with the conveyor when said receiver reaches said discharging station.

3. In a machine of the class described, a revoluble turret having charging and discharging stations where containers are moved from a table to the turret and from the turret to the table, a supporting member mounted on said turret for revolution therewith, a container receiver pivotally carried by said supporting member for rotation thereon and having a chamber adapted to communicate with the interior of the container to treat its contents with fluid under pressure, said receiver also having means for forming a seal around the opening in the container when said chamber communicates therewith, and a substantially flat platform adapted to receive the base of a container and mounted for vertical movement to clamp the margins of the opening in the container against said seal forming means, said supporting member having a conduit therein and said turret having means connecting said conduit with a source of fluid under pressure, said receiver having a port to said chamber adapted to be aligned with said conduit and being pivotally carried by said supporting member for turning movement thereon, means coordinated with the revolution of said turret for turning said receiver between upright and inverted positions, said turning movement moving said port between positions in and out of alignment with said conduit to control the introduction of fluid under pressure to the interior of the container, and means on said turret for moving said platform to position level with the table when said receiver reaches said charging and discharging stations.

4. In a machine of the class described, a revoluble turret, a supporting member mounted for revolution with said turret adjacent the periphery thereof, a container receiver pivotally carried by said supporting member for rotation thereon, means coordinated with the revolution of said turret for rotating said receiver on said supporting member between upright and inverted positions, and means for exhausting gases from, and for supplying fluid under pressure to the interior of the container to treat the contents thereof, the last-mentioned means including valve means controlled by the rotation of said receiver with respect to said supporting member for causing gases to exhaust from the container when said receiver is in substantially upright position, and for delivering fluid under pressure to the container when said receiver is inverted.

5. In a machine of the class described, a revoluble turret, a supporting member mounted for revolution with said turret, a container receiver pivotally carried by said supporting member for rotation thereon, said receiver having a chamber adapted to communicate with the interior of the container to exhaust gases therefrom and to treat its contents with fluid under pressure, and having means for forming a seal around the opening in the container when said chamber communicates therewith, said supporting member having an exhaust conduit and a delivery conduit therein and said turret having means connecting said delivery conduit with a source of fluid under pressure, said receiver having a port to said chamber adapted for alternate alignment with said conduits and being pivotally carried by said supporting member for turning movement thereon, means coordinated with the revolution of said turret for turning said receiver between upright and inverted positions, said turning movement moving said port from alignment with said exhaust conduit when said receiver is in substantially upright position, to alignment with said delivery conduit while said receiver is turning to inverted position.

6. In a machine of the class described, a revoluble turret, a supporting member mounted on said turret adjacent the periphery thereof for revolution therewith, a container receiver pivotally carried by said supporting member for rotation thereon, means coordinated with the revolution of said turret for rotating said receiver on said supporting member between upright and inverted positions, means for exhausting gases from, and for supplying fluid under pressure to the interior of the container to treat the contents thereof, said last named means and said receiver cooperating to cause fluid under pressure to be initially supplied to the container when said receiver is in upright position, and means controlled by the rotation of said receiver with respect to said supporting member to thereafter successively cause gases to be exhausted from the container and fluid to be again supplied thereto.

7. In a machine for treating containers having openings in their upper ends, a revoluble turret, a container receiver mounted on said turret for revolution therewith and having a chamber adapted to communicate with the interior of the container to exhaust gases therefrom and to treat its contents with fluid under pressure, said receiver having means for forming a seal around the opening in the container when said chamber communicates therewith, and a container receiving platform mounted for movement toward said seal forming means to clamp the margins of the opening in the container thereagainst, said turret having means for exhausting gases from said chamber, and means for supplying fluid under pressure thereto, said receiver, including said platform, being pivotally mounted on said turret for turning movement thereon, means coordinated with the revolution of said turret for turning said receiver between upright and inverted positions, said fluid supply means and said receiver cooperating to cause fluid under pressure to be initially supplied to the container through said chamber when said receiver is in upright position, and means controlled by the turning of said receiver to thereafter successively cause gases to be exhausted from the container through said chamber and fluid to be again supplied thereto through said chamber.

8. In a machine of the class described, a revoluble turret, a supporting member mounted for revolution with said turret, a container receiver pivotally carried by said supporting member for rotation thereon, said receiver having a chamber adapted to communicate with the interior of the container to exhaust gases therefrom and to treat its contents with fluid under pressure, and having means for forming a seal around the opening in the container when said chamber communicates therewith, said supporting member having an exhaust conduit and an inlet conduit therein and said turret having means connecting said inlet conduit with a source of fluid under pressure, said receiver having a port to said chamber adapted for alternate alignment with said conduits and being pivotally carried by said supporting member for turning movement thereon, means coordinated with the revolution of said turret for turning said receiver between upright and inverted positions, said port being in alignment with said inlet conduit to cause fluid under pressure to be initially supplied to the container through said chamber when said receiver is in upright position, said turning movement moving said port successively past said exhaust conduit and again into alignment with said inlet conduit to cause gases to be exhausted from the container and fluid to be again supplied thereto through said chamber.

9. In a machine of the class described, a revoluble turret, a plurality of supporting members mounted on said turret adjacent the periphery thereof for revolution therewith, a container receiver pivotally carried by each of said supporting members for rotation thereon, said receivers each having means for simultaneously carrying a plurality of containers, means coordinated with the revolution of said turret for rotating said receivers on said supporting members between upright and inverted positions, means for supplying fluid under pressure to the interior of the containers in the receivers to simultaneously treat the contents thereof, and means operable by the rotation of said receivers with respect to said supporting members for controlling the supply of fluid to the containers.

10. In a machine of the class described, a revoluble turret, a supporting member mounted for revolution with said turret adjacent the periphery thereof, a container receiving assembly pivotally carried by said supporting member for rotation thereon and having means for simultaneously carrying a plurality of containers, means coordinated with the revolution of said turret for rotating said assembly on said supporting member between upright and inverted positions, and means for exhausting gases from the containers simultaneously, and for supplying fluid under pressure to the interior of the containers simultaneously to treat the contents thereof said last named means comprising an exhaust conduit, a fluid pressure conduit, and means controlled by the rotation of said assembly with respect to said supporting member for simultaneously establishing communication between the first-mentioned conduit and the containers when said assembly is in substantially upright position, and for simultaneously establishing communication between the second-mentioned conduit and the containers when said receiver is inverted.

11. In a machine of the class described having a revoluble turret, a container receiver carried by the turret for revolution therewith but mounted on the turret for turning movement with respect thereto during revolution of the turret, said receiver having means for carrying a plurality of containers comprising a plurality of treating heads having abutments which simultaneously engage and seal around the openings in the tops of the containers, and a corresponding plurality of platforms spaced from said abutments for engaging the bottoms of the containers and urging the same against the abutments, the containers being thereby retained between their respective abutments and platforms, and means on said receiver actuated during revolution of the turret for turning said receiver and the containers between upright and inverted positions.

12. In a machine of the class described having a revoluble turret, a container receiver carried by the turret for revolution therewith, but mounted on the turret for turning movement with respect thereto during revolution of the turret, said receiver having means for carrying a plurality of containers comprising a plurality of treating heads having abutments to simultaneously engage and seal around the openings in the tops of the containers, and a platform spaced from said abutments for engaging the bottoms of the containers and mounted on said receiver for limited movement from and toward said abutments, means on said receiver for urging said platform toward said abutments, the containers being thereby retained between said abutments and said platform, means on said receiver actuated during the revolution of the turret for turning said receiver and the containers between upright and inverted positions, and means on said receiver actuated during revolution of the turret for moving said platform from said abutment to permit the containers to be simultaneously positioned on and removed from said platform.

13. In a machine of the class described having a revoluble turret, a container receiver carried by the turret for revolution therewith but mounted on the turret for turning movement with respect thereto during revolution of the turret, said receiver having means for carrying a plurality of containers comprising a plurality of treating heads having abutments which simultaneously engage and seal around the openings in the tops of the containers, and a platform spaced from said abutments for engaging the bottoms of the containers, the containers being thereby retained between their respective abutments and said platform, means on said receiver for positioning said containers on said platform with the openings in their tops in alignment with said abutments, and means on said receiver actuated during revolution of the turret for turning said receiver and the containers between upright and inverted positions.

14. An apparatus for processing the contents of filled containers having apertured and valved upper ends, comprising a revoluble turret, a container receiving and supporting platform, a processing head spaced from and facing the platform, means for urging the platform toward the head to register the aperture in the container with the head and to clamp the container thereagainst, means actuated by the revolution of the turret for rotating the platform and the head relative to the turret to invert and revert the container, spaced vacuum and processing-fluid conduits fixedly carried by the turret and leading toward the head, valve means controlled by the rotation of the platform and head for establishing communication with the first conduit when the container is upright and for establishing communication with the second conduit when the container is inverted, and means for moving the platform away from the head to permit removal of the container therefrom.

15. An apparatus for processing the contents of filled containers having apertured and valved upper ends, comprising a turret mounted for rotation about a vertical axis; a plurality of container supporting and processing assemblies mounted on the turret for rotation about substantially radial axes, and each comprising a normally horizontally disposed, vertically movable container supporting platform, a processing head spaced thereabove, means for raising the platform from a container receiving position to a position clamping the margins of the aperture in the container against said head, and a conduit connected to the head and leading toward the turret; a plurality of pairs of vacuum and steam conduits carried by the turret and leading to the assemblies; means for rotating the assemblies from the container receiving position where the assembly conduit communicates with the vacuum conduit to an inverted position establishing communication with the steam conduit, to process the container contents in inverted position; means for reverting the containers to upright position; and means for lowering the container supporting platforms and the containers, to permit discharge thereof from the assemblies.

16. An apparatus for processing the contents of filled containers comprising a turret rotatable about a vertical axis, a container supporting assembly mounted on the turret for rotation about a substantially radial axis and comprising a processing head, a container supporting platform mounted for movement toward and from the head to clamp a container thereagainst and to release the same, and a conduit leading from the head toward the turret, means for rotating the assembly with a container supported therein from a container receiving position to an inverted position, an apertured valve plate carried by the turret facing the assembly and having spaced vacuum and steam passages positioned to register successively with the assembly conduit as the assembly is rotated, and means for discharging the container from the platform.

JOHN MILLS.